US011249816B2

(12) United States Patent
Aoki

(10) Patent No.: US 11,249,816 B2
(45) Date of Patent: Feb. 15, 2022

(54) PIVOT RACK

(71) Applicant: Intel Corporation, Santa Clara, CA (US)

(72) Inventor: Russell Aoki, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 890 days.

(21) Appl. No.: 15/859,391

(22) Filed: Dec. 30, 2017

(65) Prior Publication Data

US 2019/0069434 A1    Feb. 28, 2019

Related U.S. Application Data

(60) Provisional application No. 62/584,401, filed on Nov. 10, 2017.

(30) Foreign Application Priority Data

Aug. 30, 2017 (IN) .............................. 201741030632

(51) Int. Cl.
*H05K 7/14* (2006.01)
*G06F 9/50* (2006.01)
(Continued)

(52) U.S. Cl.
CPC ........ *G06F 9/5088* (2013.01); *B25J 15/0014* (2013.01); *G06F 1/183* (2013.01); *G06F 1/20* (2013.01); *G06F 9/505* (2013.01); *G06F 11/3442* (2013.01); *G06F 15/7807* (2013.01); *G06F 15/7867* (2013.01); *H04L 41/5025* (2013.01); *H04L 67/1008* (2013.01); *H05K 7/1489* (2013.01); *H05K 7/18* (2013.01);
(Continued)

(58) Field of Classification Search
CPC .......... G06F 9/5088; G06F 1/183; G06F 1/20; G06F 9/505; G06F 11/3442; G06F 15/7807; G06F 15/7867; G06F 9/44; G06F 9/4856; G06F 9/5061; G06F 13/4022; G06F 21/105; G06F 2200/201; G06F 1/1681; B25J 15/0014; H04L 41/5025; H04L 67/1008; H04L 41/0896; H04L 41/14; H04L 41/5019; H04L 49/40; H04L 63/0428; G06N 3/063; G06Q 10/0631; G06Q 30/0283; H05K 7/1489; H05K 7/18; H05K 7/20209; H05K 7/20736; H05K 7/1411; H05K 7/1487; H05K 5/0226; H05K 7/1401; H05K 7/2079; E05D 11/105; E05D 11/1078; E06B 3/325
See application file for complete search history.

(56) References Cited

U.S. PATENT DOCUMENTS 4,258,967 A * 3/1981 Boudreau ............... A47B 88/48
312/273
4,853,916 A * 8/1989 Tomita ................. G11B 17/225
369/30.43

(Continued)

*Primary Examiner* — Michael A Matey
(74) *Attorney, Agent, or Firm* — Compass IP Law, PC

(57) ABSTRACT

Racks and rack systems to support a plurality of sleds are disclosed herein. A rack comprises an elongated support post and a plurality of support chassis. The elongated support post extends vertically. The plurality of support chassis are coupled to the elongated support post. Each support chassis of the plurality of support chassis is sized to house a corresponding sled of the plurality of sleds.

26 Claims, 20 Drawing Sheets

(51) Int. Cl.

| | | |
|---|---|---|
| *H04L 12/24* | (2006.01) | |
| *G06F 11/34* | (2006.01) | |
| *B25J 15/00* | (2006.01) | |
| *G06F 1/18* | (2006.01) | |
| *G06F 1/20* | (2006.01) | |
| *G06F 15/78* | (2006.01) | |
| *H05K 7/18* | (2006.01) | |
| *H05K 7/20* | (2006.01) | |
| *H04L 29/08* | (2006.01) | |
| *G06N 3/063* | (2006.01) | |
| *G06F 21/10* | (2013.01) | |
| *G06Q 30/02* | (2012.01) | |
| *G06F 9/44* | (2018.01) | |
| *G06F 13/40* | (2006.01) | |
| *G06Q 10/06* | (2012.01) | |
| *H04L 12/931* | (2013.01) | |
| *G06F 9/48* | (2006.01) | |
| *H04L 29/06* | (2006.01) | |

(52) U.S. Cl.
CPC ..... *H05K 7/20209* (2013.01); *H05K 7/20736* (2013.01); *G06F 9/44* (2013.01); *G06F 9/4856* (2013.01); *G06F 9/5061* (2013.01); *G06F 13/4022* (2013.01); *G06F 21/105* (2013.01); *G06F 2200/201* (2013.01); *G06N 3/063* (2013.01); *G06Q 10/0631* (2013.01); *G06Q 30/0283* (2013.01); *H04L 41/0896* (2013.01); *H04L 41/14* (2013.01); *H04L 41/5019* (2013.01); *H04L 49/40* (2013.01); *H04L 63/0428* (2013.01); *H05K 7/1498* (2013.01)

(56) References Cited

U.S. PATENT DOCUMENTS

| | | | |
|---|---|---|---|
| 5,036,503 A * | 7/1991 | Tomita | G11B 19/12 369/30.43 |
| 5,226,714 A * | 7/1993 | Wright | A47B 88/48 312/323 |
| 5,469,335 A * | 11/1995 | Kluth | H01R 31/00 361/752 |
| 5,584,396 A * | 12/1996 | Schmitt | H02B 1/36 211/26 |
| 6,082,845 A * | 7/2000 | Eizadkhah | H05K 7/16 312/223.1 |
| 6,181,549 B1 * | 1/2001 | Mills | H05K 7/1489 292/114 |
| 6,459,571 B1 * | 10/2002 | Carteau | G06F 1/184 312/35 |
| 6,498,716 B1 * | 12/2002 | Salinas | G06F 1/189 307/150 |
| 7,500,573 B1 * | 3/2009 | Flynn | B68C 1/002 211/85.11 |
| 8,164,907 B2 * | 4/2012 | Hannula | G06F 1/188 361/728 |
| 8,379,388 B2 * | 2/2013 | Chen | H05K 7/1491 361/695 |
| 8,582,299 B1 * | 11/2013 | Phillips | G06F 1/181 361/724 |
| 8,638,558 B2 * | 1/2014 | Takada | H05K 7/1492 361/695 |
| 8,953,337 B2 * | 2/2015 | Inoue | H05K 7/1445 361/788 |
| 10,037,061 B1 * | 7/2018 | Panchapakesan | H05K 7/20736 |
| 10,334,760 B1 * | 6/2019 | Darland | H05K 7/1489 |
| 2003/0081386 A1 * | 5/2003 | Robillard | H05K 7/1492 361/724 |
| 2003/0112593 A1 * | 6/2003 | Smith | G06F 1/181 361/679.32 |
| 2003/0172205 A1 * | 9/2003 | Bastian | G06C 15/00 710/45 |
| 2006/0275008 A1 * | 12/2006 | Xin | G02B 6/4455 385/135 |
| 2007/0081308 A1 * | 4/2007 | Ishida | H05K 7/1492 361/724 |
| 2007/0115627 A1 * | 5/2007 | Carlisi | H05K 7/1489 361/679.01 |
| 2011/0138095 A1 * | 6/2011 | Campbell | G06F 13/409 710/301 |
| 2012/0224313 A1 * | 9/2012 | Hu | H05K 7/1489 361/679.4 |
| 2013/0039006 A1 * | 2/2013 | Li | H05K 7/20736 361/679.48 |
| 2013/0067248 A1 * | 3/2013 | Wang | G06F 1/189 713/300 |
| 2013/0135805 A1 * | 5/2013 | Wang | H05K 7/1492 361/679.02 |
| 2013/0198532 A1 * | 8/2013 | Bailey | G06F 1/26 713/300 |
| 2014/0055959 A1 * | 2/2014 | Manda | G11B 33/128 361/728 |
| 2016/0047999 A1 * | 2/2016 | Alexi | G02B 6/4471 385/135 |
| 2016/0234962 A1 * | 8/2016 | Shinsato | G11B 33/128 |
| 2017/0049009 A1 * | 2/2017 | Steinke | H05K 7/20772 |

\* cited by examiner ic
PIVOT RACK

CROSS-REFERENCE TO RELATED APPLICATIONS

The present application claims the benefit of Indian Provisional Patent Application No. 201741030632, filed Aug. 30, 2017, and U.S. Provisional Patent Application No. 62/584,401, filed Nov. 10, 2017.

BACKGROUND

Typical enterprise-level data centers can include several to hundreds of racks or cabinets, with each rack/cabinet housing multiple servers. Each of the various servers of a data center may be communicatively connectable to each other via one or more local networking switches, routers, and/or other interconnecting devices, cables, and/or interfaces. The number of racks and servers of a particular data center, as well as the complexity of the design of the data center, may depend on the intended use of the data center, as well as the quality of service the data center is intended to provide.

Traditional rack systems are self-contained physical support structures that include a number of pre-defined server spaces. A corresponding server may be mounted in each pre-defined server space. When the server is mounted in the pre-defined server space of a conventional rack system, access to serviceable items of the server may be restricted.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
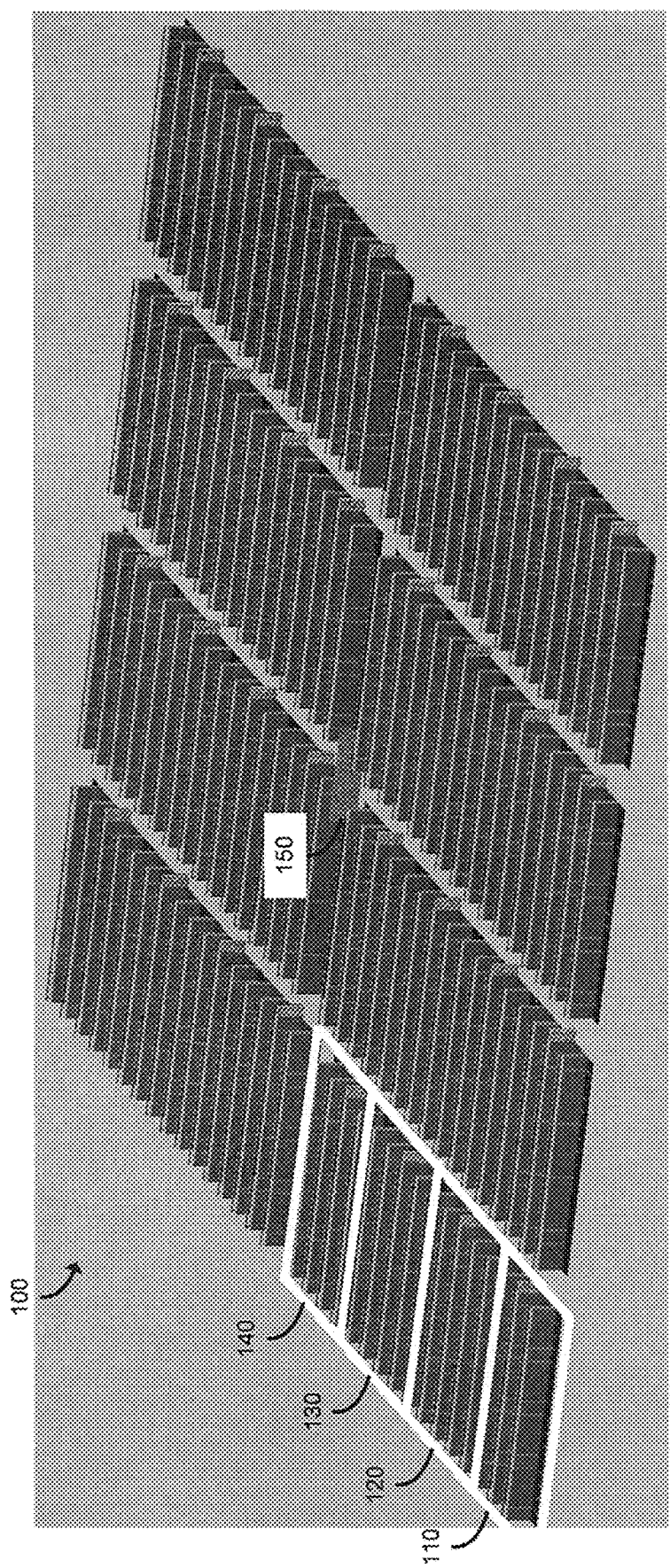
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. As described in more detail herein, each rack houses multiple sleds, which each may be embodied as a compute device, such as a server, that is primarily equipped with a particular type of resource (e.g., memory devices, data storage devices, accelerator devices, general purpose processors). In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. As described in more detail herein, resources within sleds in the data center 100 may be allocated to a group (referred to herein as a "managed node") containing resources from one or more other sleds to be collectively utilized in the execution of a workload. The workload can execute as if the resources belonging to the managed node were located on the same sled. The resources in a managed node may even belong to sleds belonging to different racks, and even to different pods 110, 120, 130, 140. Some resources of a single sled may be allocated to one managed node while other resources of the same sled are allocated to a different managed node (e.g., one processor assigned to one managed node and another processor of the same sled assigned to a different managed node). By disaggregating resources to sleds comprised predominantly of a single type of resource (e.g., compute sleds comprising primarily compute resources, memory sleds containing primarily memory resources), and selectively allocating and deallocating the disaggregated resources to form a managed node assigned to execute a workload, the data center 100 provides more efficient resource usage over typical data centers comprised of hyperconverged servers containing compute, memory, storage and perhaps additional resources). As such, the data center 100 may provide greater performance (e.g., throughput, operations per second, latency, etc.) than a typical data center that has the same number of resources.

Figure 2:
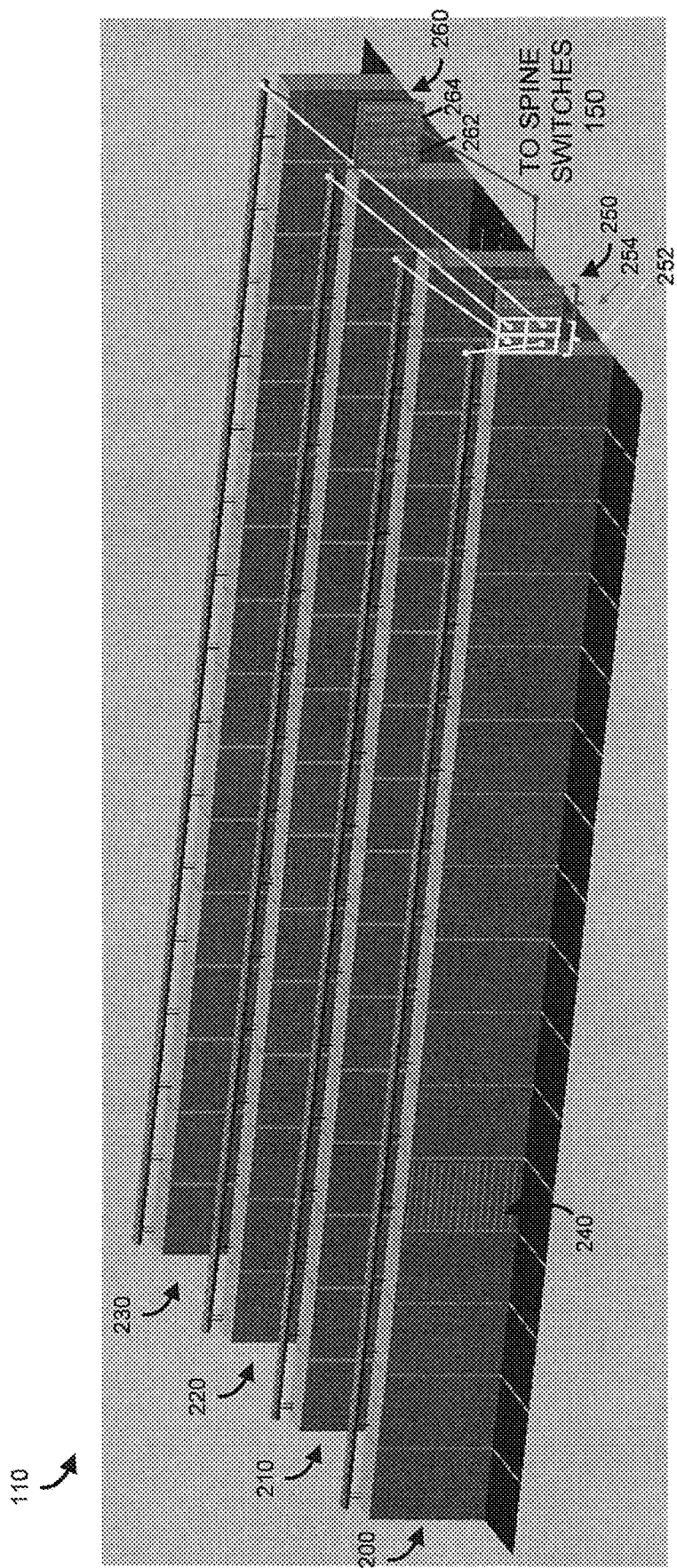
FIG. 2 is a simplified diagram of at least one embodiment of a pod of the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, Infiniband) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to different number of pod switches (e.g., providing even more failover capacity).

Figure 3:
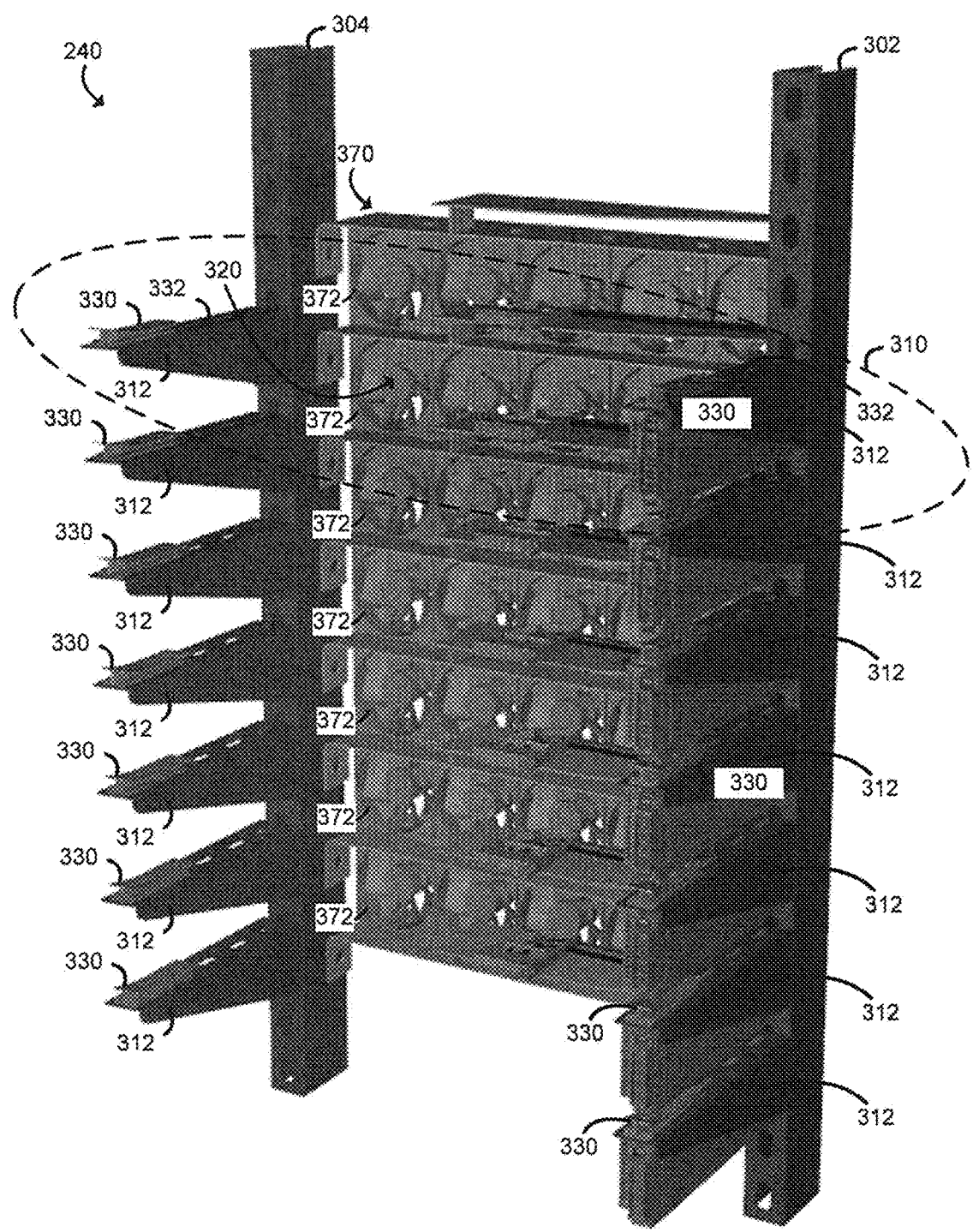
FIG. 3 is a perspective view of at least one embodiment of a rack that may be included in the pod of FIG. 2.
Figure 4:
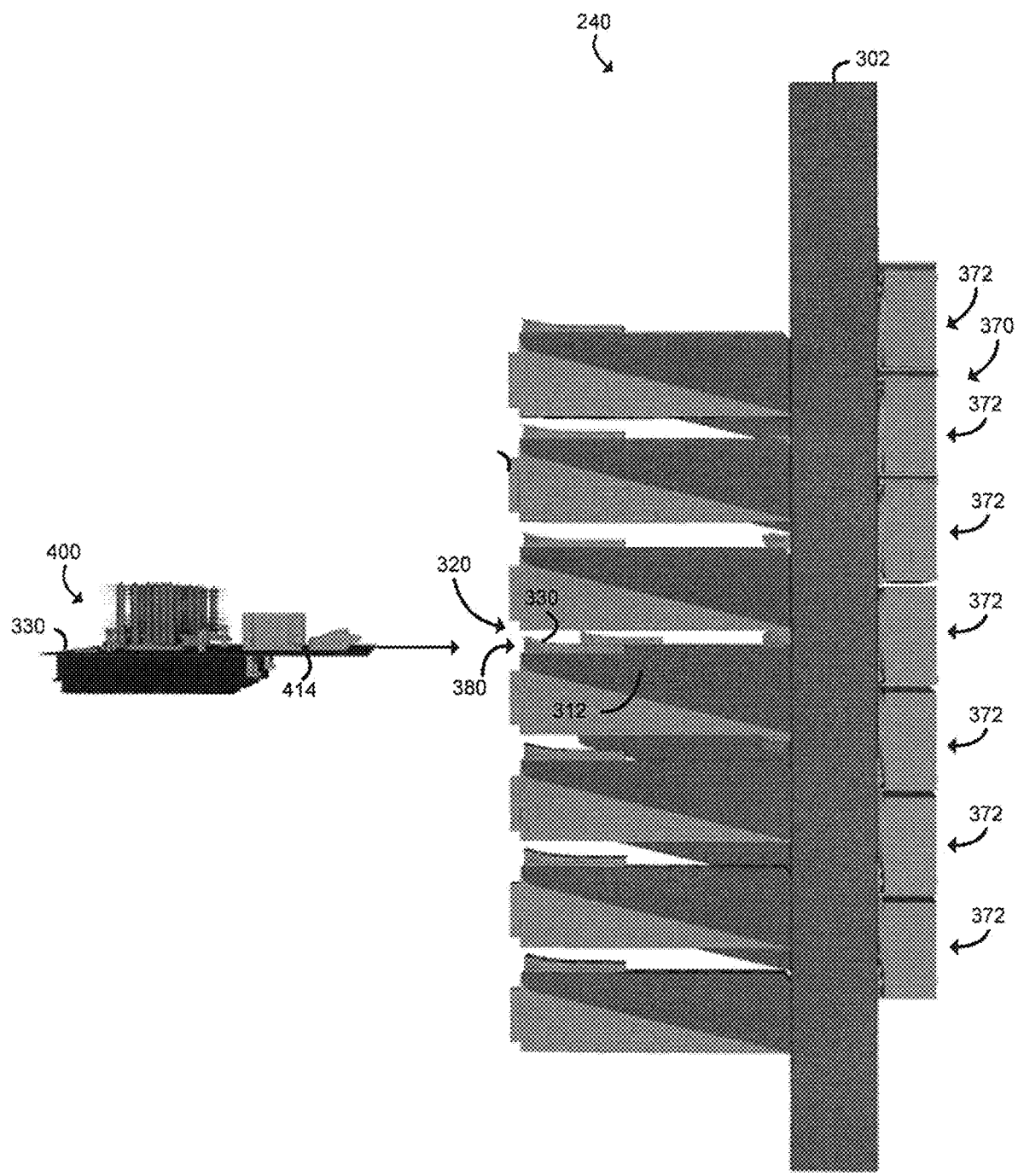
FIG. 4 is a side plan elevation view of the rack of FIG. 3.
Figure 5:
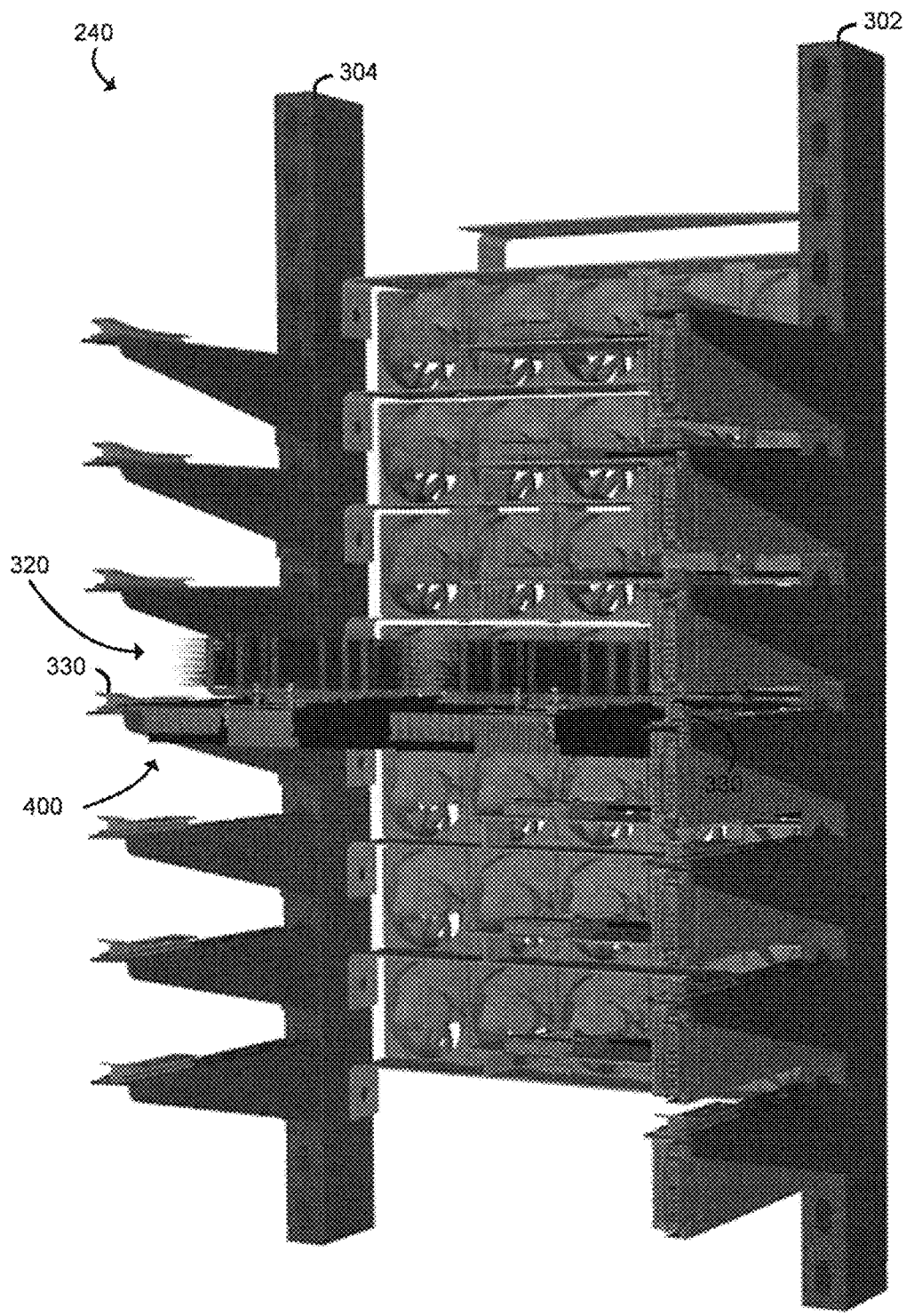
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which the interconnect may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable enters the connector mechanism. Subsequently, the optical fiber inside the cable enters a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240.

Figure 6:
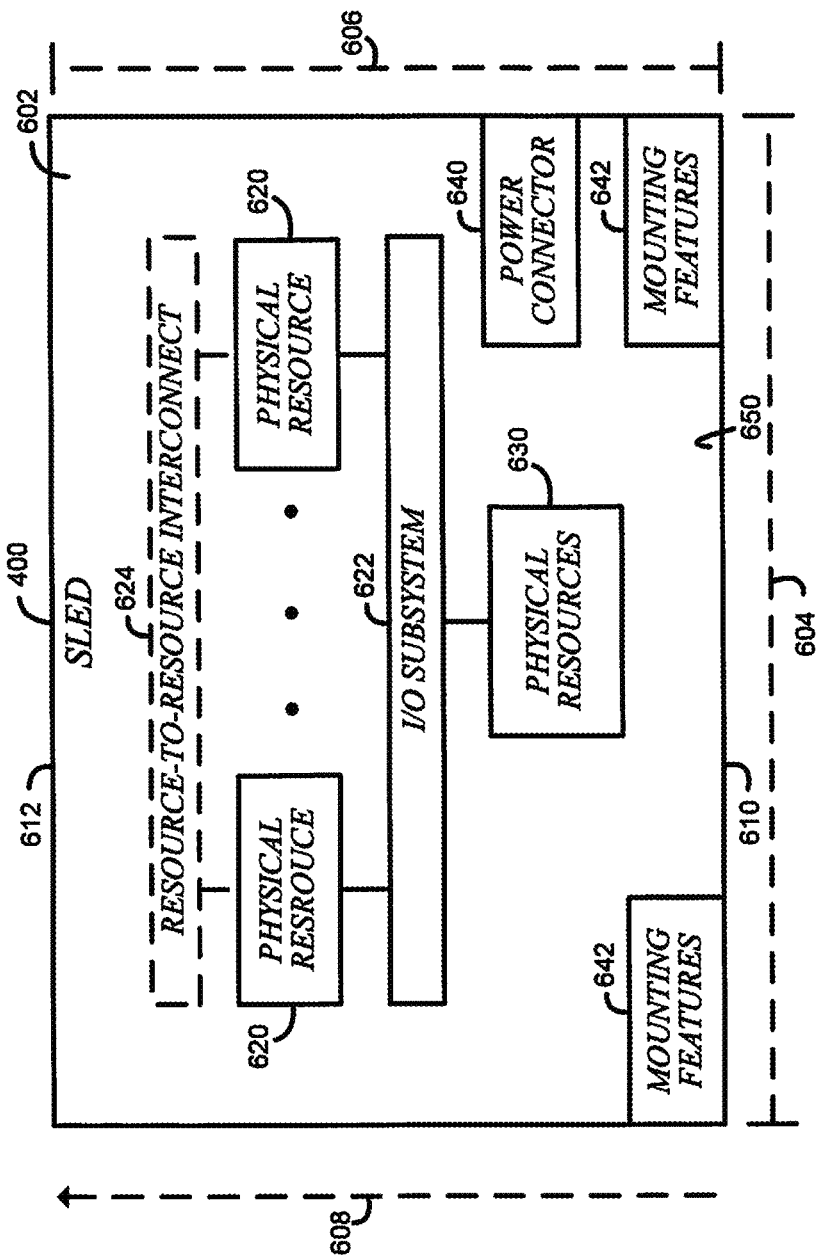
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no backplane (e.g., a backplate of the chassis) to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, power is provided to the processors 820 through vias directly under the processors 820 (e.g., through the bottom side 750 of the chassis-less circuit board substrate 602), providing an increased thermal budget, additional current and/or voltage, and better voltage control over typical boards.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
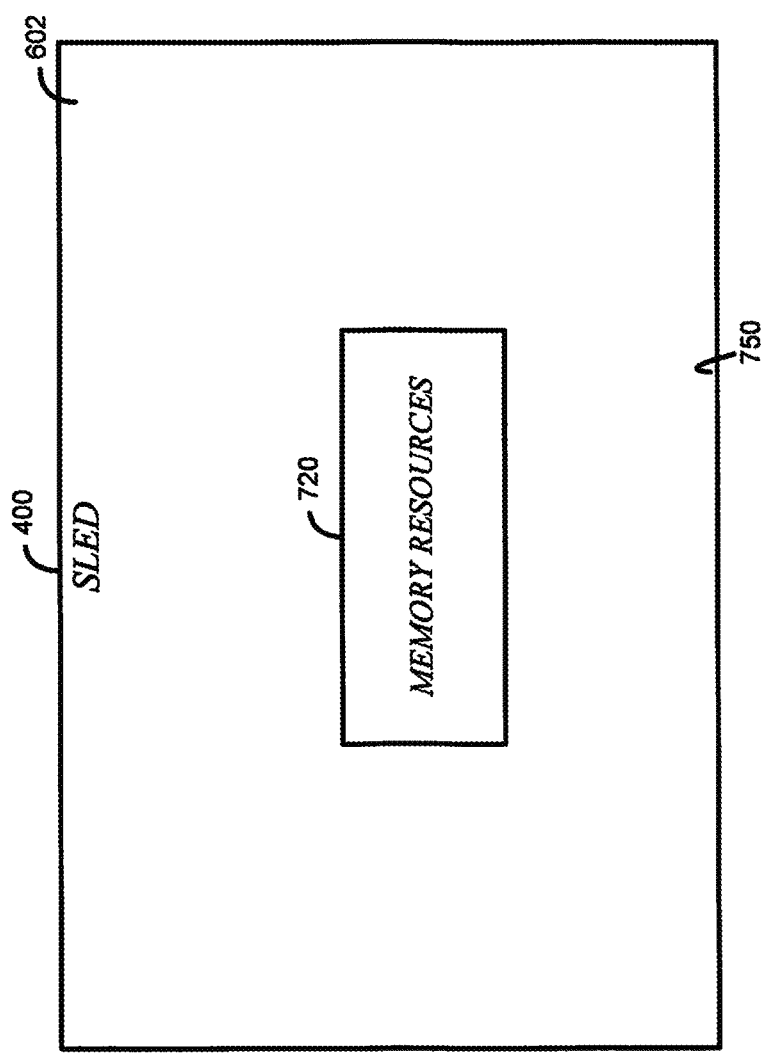
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory devices 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
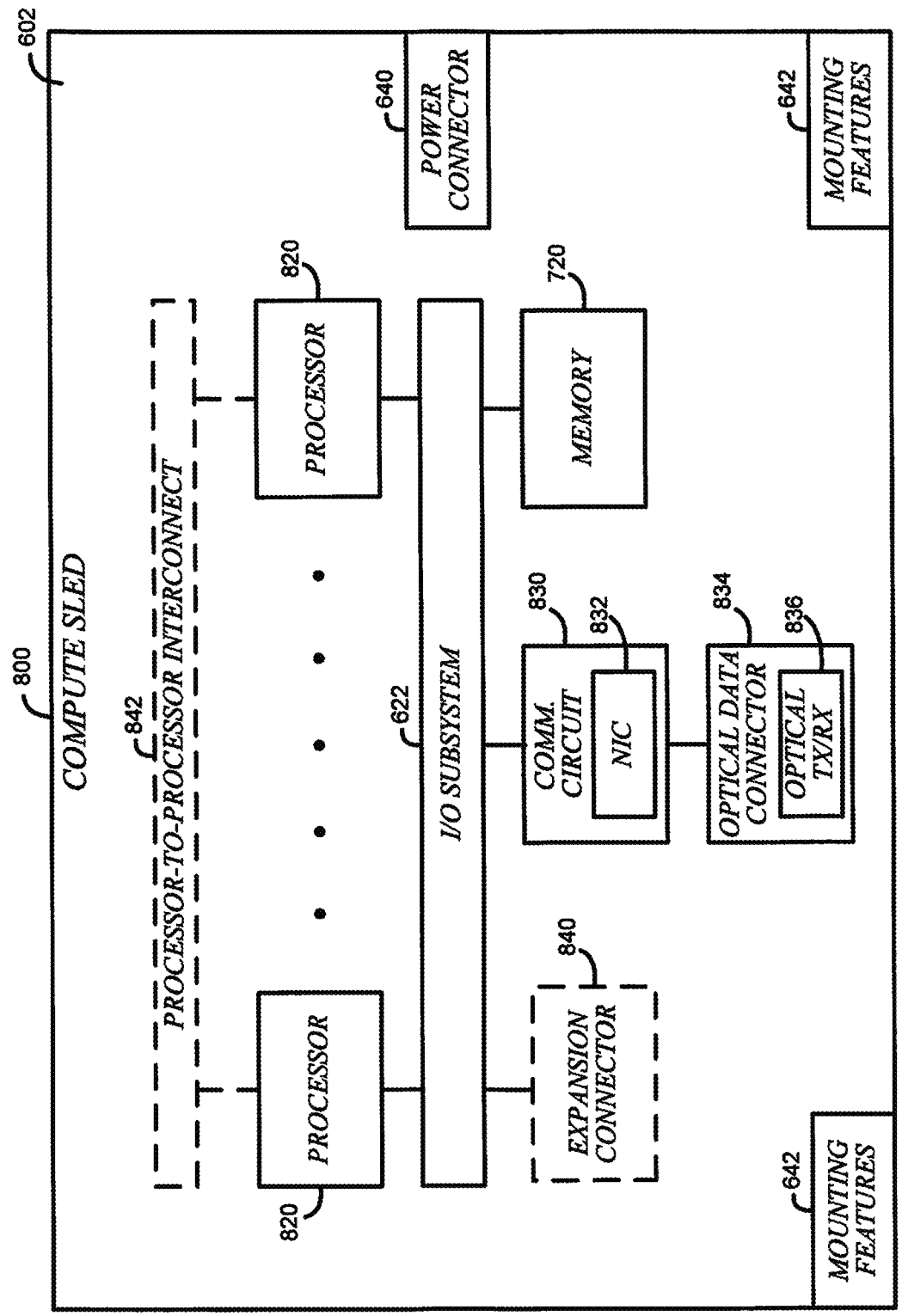
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
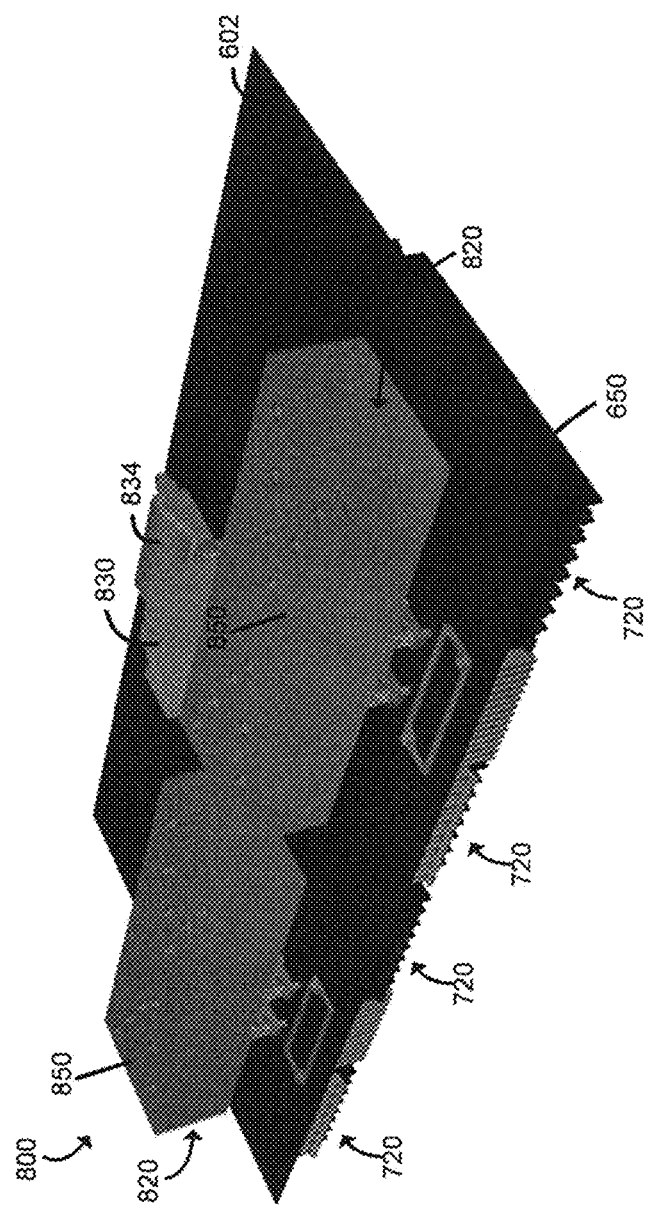
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsinks.

Figure 10:
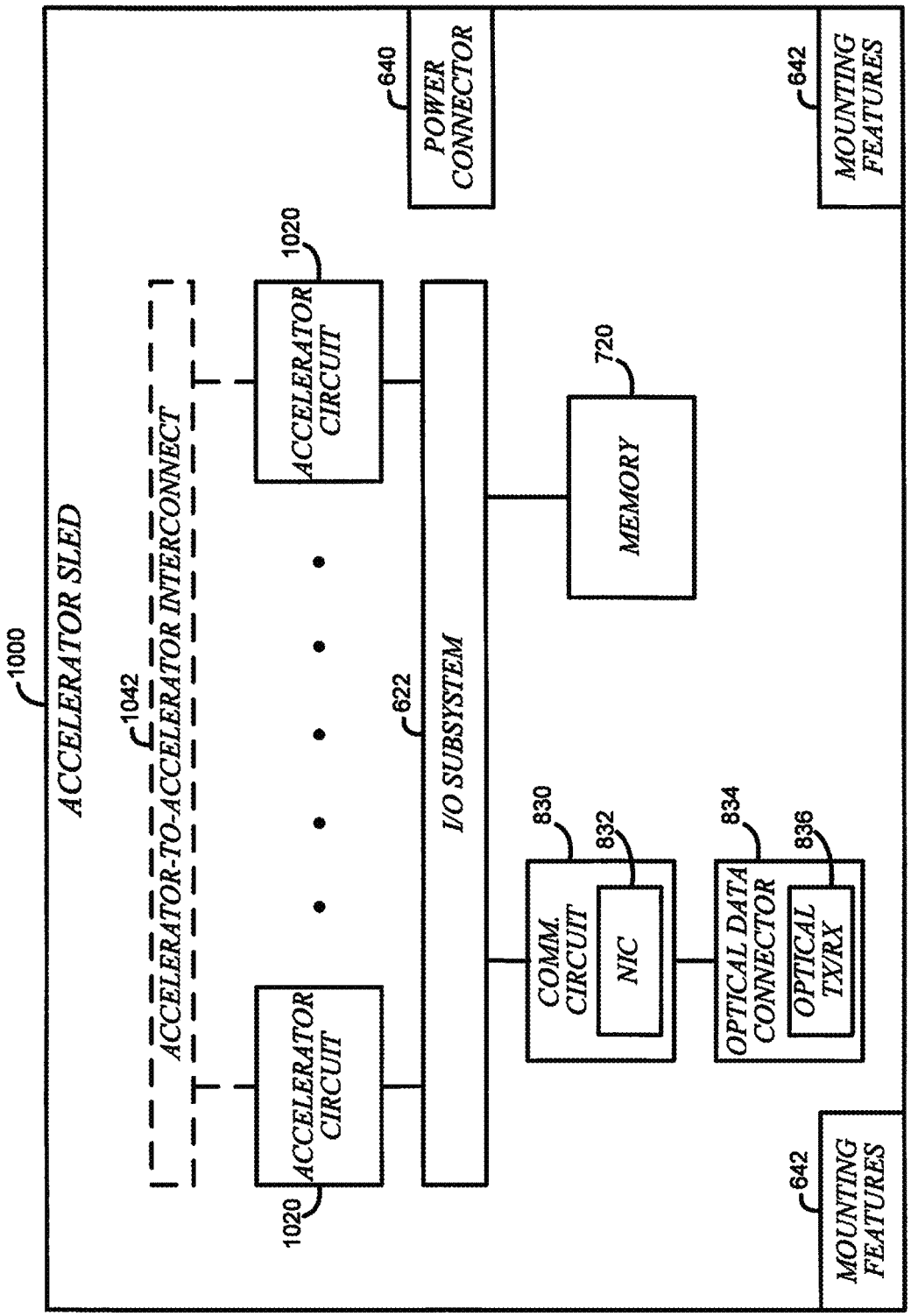
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is optimized, or otherwise configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

In the illustrative accelerator sled 1000, the physical resources 620 are embodied as accelerator circuits 1020.

Figure 11:
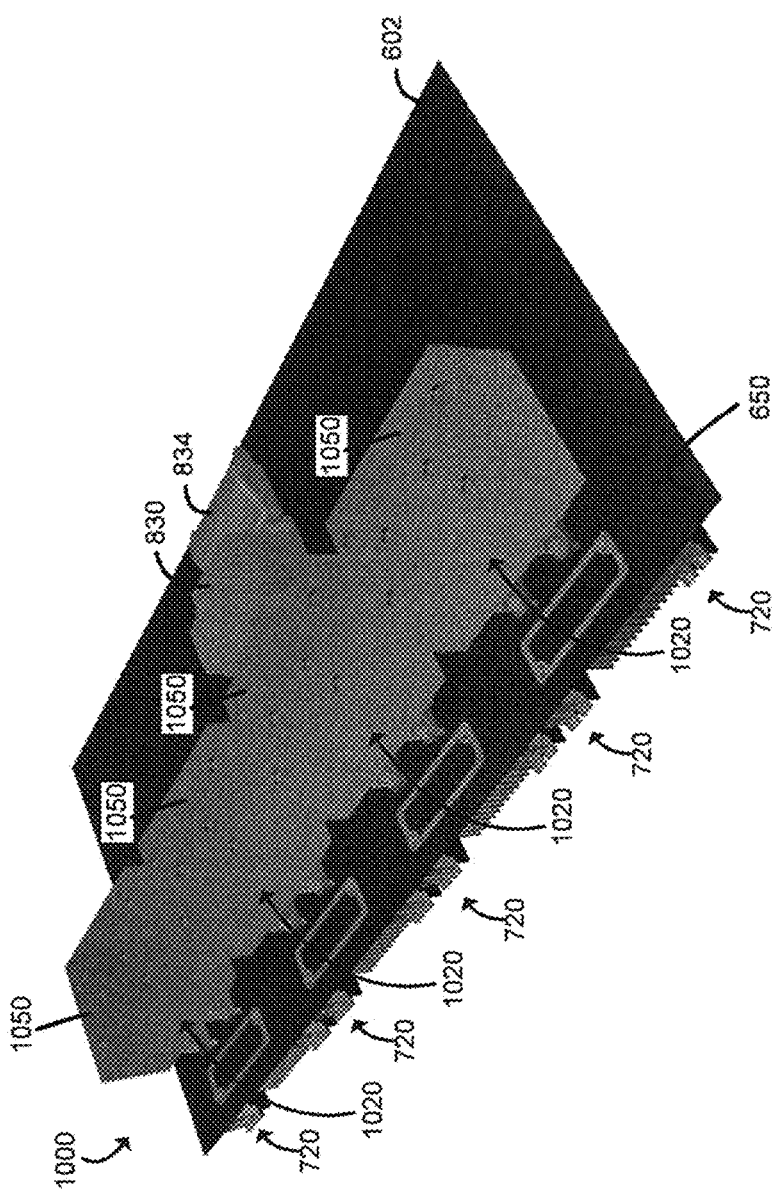
FIG. 11 is a top perspective view of at least one embodiment of the accelerator sled of FIG. 10.

Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than tradition heatsinks because of the "free" area provided by the memory devices 750 being located on the bottom side 750 of the chassis-less circuit board substrate 602 rather than on the top side 650.

Figure 12:
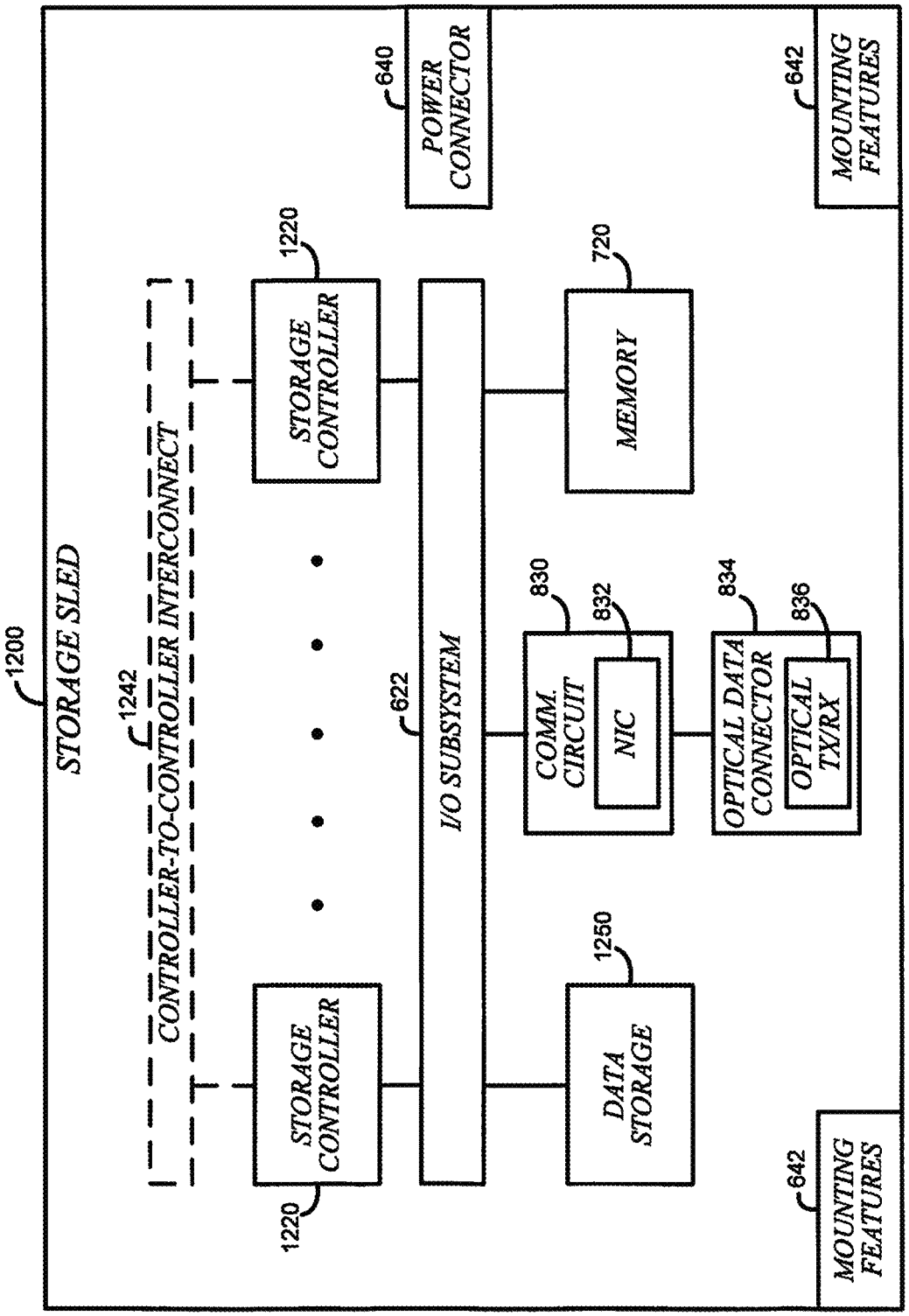
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is optimized, or otherwise configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
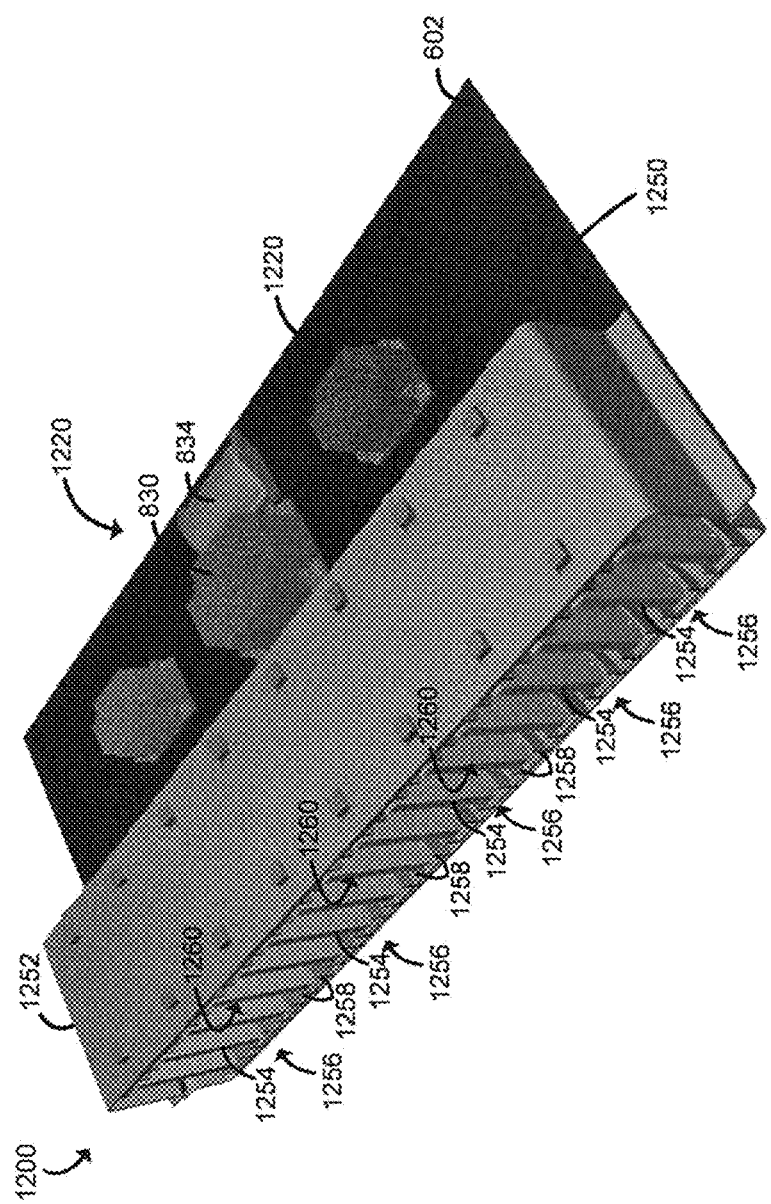
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
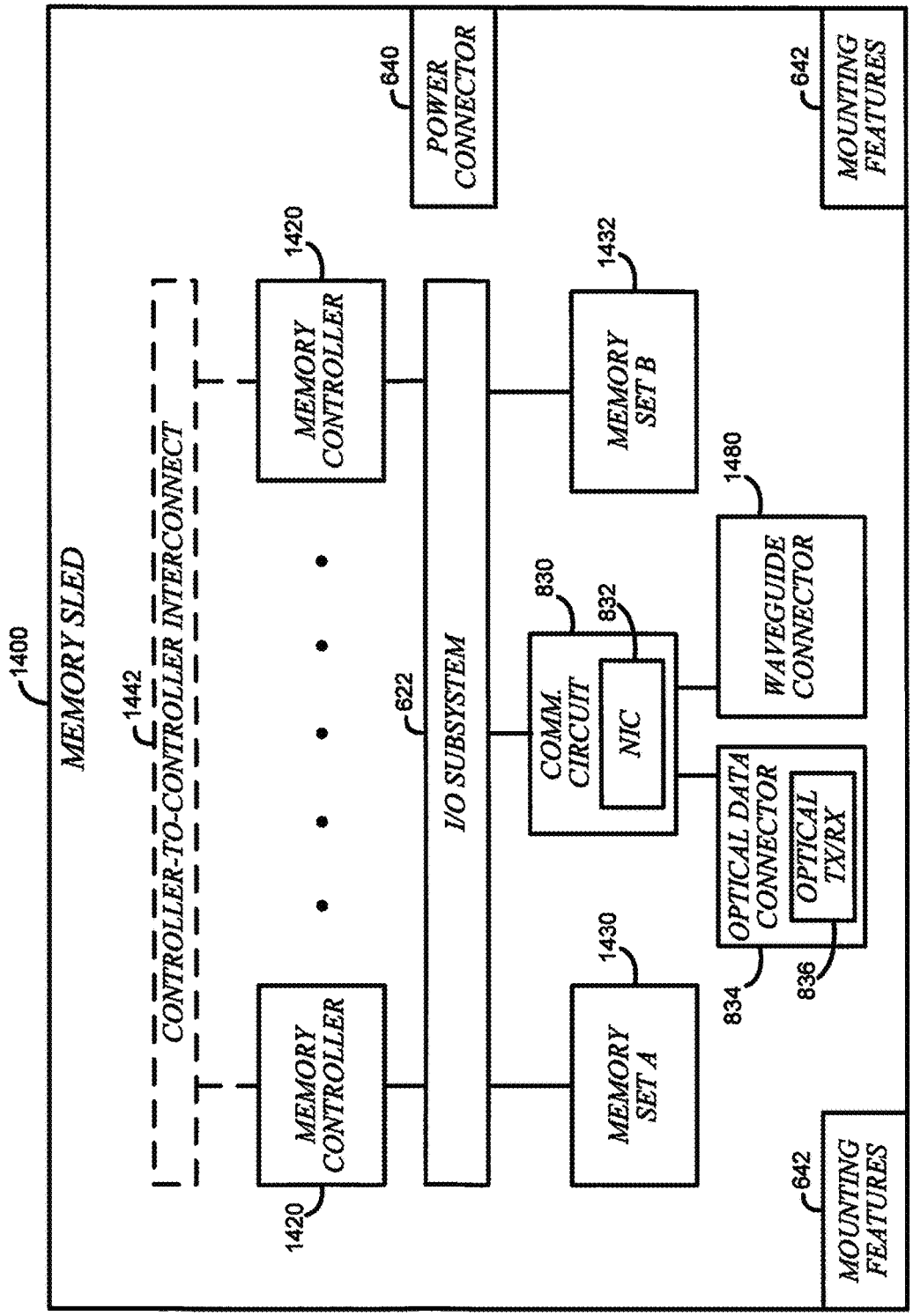
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each storage controller 1220 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Rt (i.e., transmit) lanes. Each lane, in the illustrative embodiment, is either 16 Ghz or 32 Ghz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
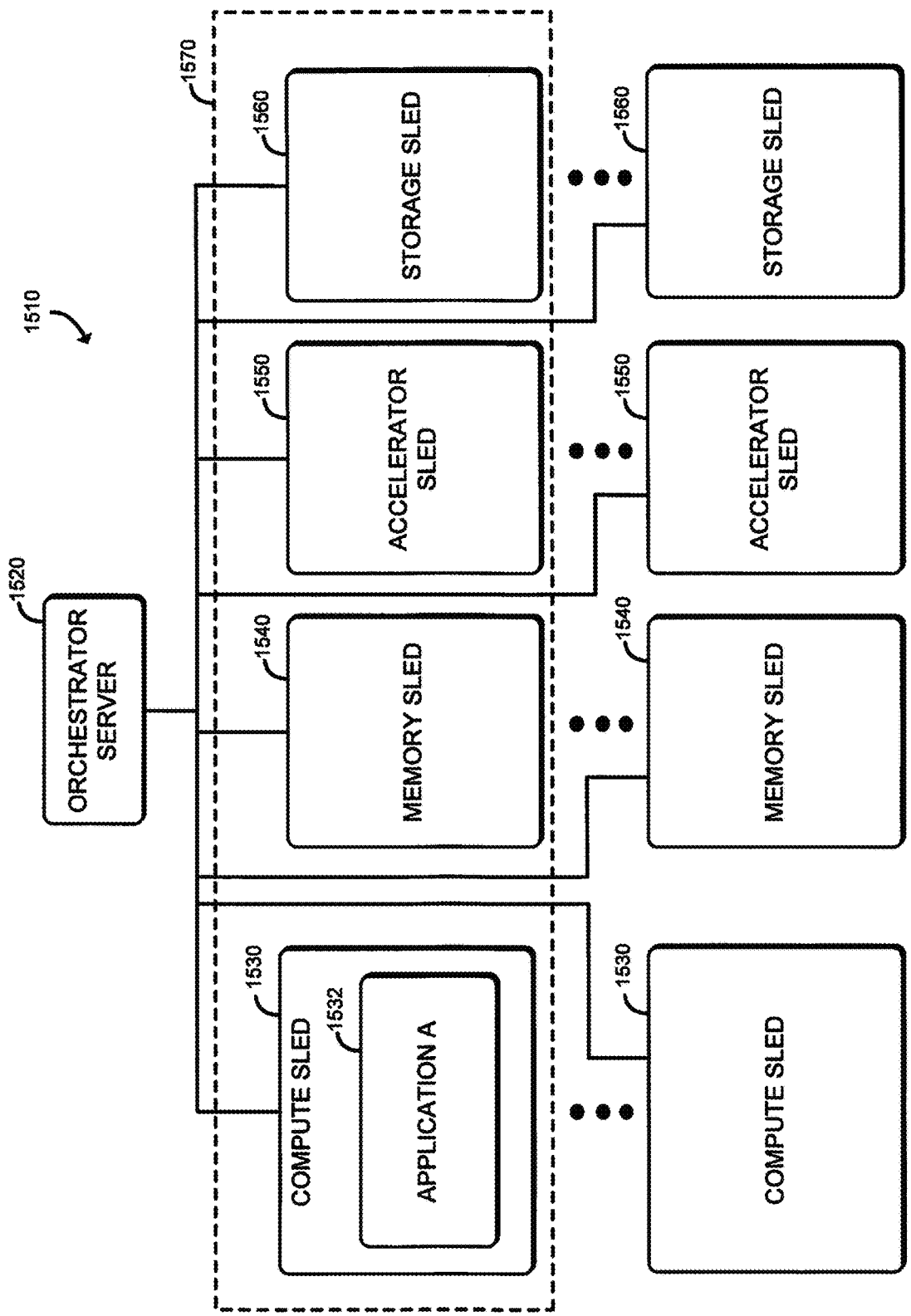
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. If the so, the orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Referring now to FIGS. 16-19, in another embodiment, an illustrative data center 1600 includes one or more racks 1602 configured to house or otherwise receive one or more sleds 1604 for mounting therein. The data center 1600 may generally be representative of any type of data center or other type of computing network. Accordingly, the data center 1600 may be similar to, embodied as, or otherwise form a part of, the data center 100 described above. The rack 1602 may house computing equipment comprising a set of physical resources, which may include processors, co-processors, accelerators, field programmable gate arrays (FPGAs), memory, and storage, for example. The rack 1602 may therefore be similar to, embodied as, or otherwise form a part of, the rack 240 described above. Each of the sleds 1604 may be embodied as a circuit board on which components such as CPUs, memory, and/or other components are placed. As such, each of the sleds 1604 may be similar to, embodied as, or otherwise form a part of, the sleds 400, 800, 1000, 1200, 1400, described above. For example, each sled 1604 may be embodied as a compute sled, a memory sled, an accelerator sled, a data storage sled, and/or other physical resource sled.

Figure 16:
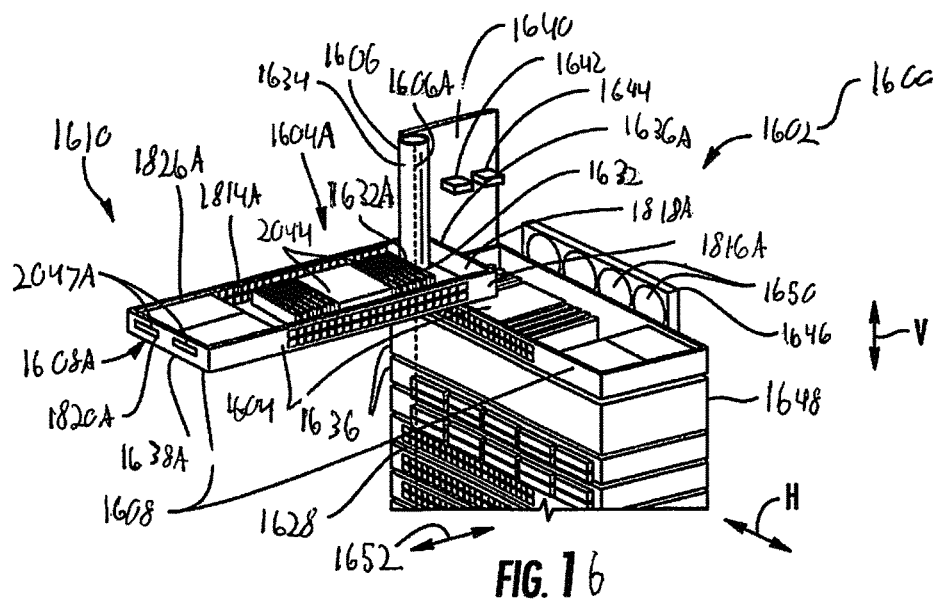
FIG. 16 is a perspective view of at least one embodiment of a rack of the data center of FIG. 1 with a support chassis of the rack in an opened position.

The illustrative rack 1600 includes an elongated support post 1606 and multiple support chassis 1608 coupled to the elongated support post 1606. The elongated support post 1606 extends in a vertical direction indicated by arrow V. Each one of the support chassis 1608 is sized to house a corresponding one of the sleds 1604. As further discussed below, each one of the support chassis 1608 is pivotally movable relative to the elongated support post 1606 between an opened position 1610 (see FIG. 16) and a closed position 1710 (see FIG. 17). As shown in FIG. 16, the support chassis 1608A is rotated about a vertical axis 1606A of the elongated post 1606 to the opened position 1610 to expose the sled 1604A housed by the chassis 1608A.

Figure 18:
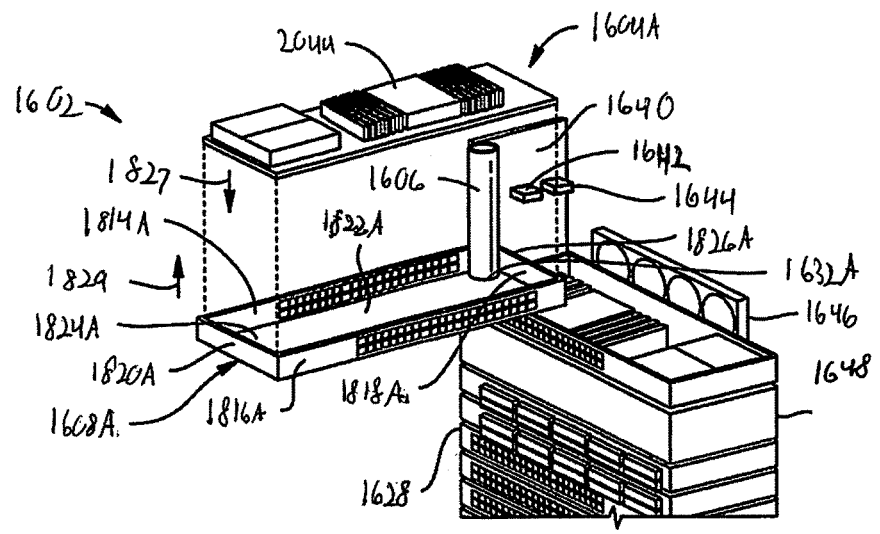
FIG. 18 is a perspective view of the rack of FIG. 16 with a sled housed by the support chassis removed from the support chassis when the support chassis is in the opened position.

When the illustrative support chassis 1608A is rotated about the vertical axis 1606A of the elongated post 1606 to the opened position 1610, the sled 1604A housed by the chassis 1608A may be dismounted from the chassis 1608A, as shown in FIG. 18. The sled 1604A may be dismounted from the chassis 1608A for maintenance and/or routing servicing, as well as for replacement and/or upgrading. After being dismounted from the chassis 1608A, the sled 1604A may be re-mounted in the chassis 1608A in preparation for re-installation in the rack 1600. In any case, when the support chassis 1608A is moved to the opened position 1610, the chassis 1608A and the sled 1604A housed therein may be accessed and/or serviced from a front side 1628 of the rack 1600. As such, space to access and/or service the illustrative rack 1600 may be provided along only the front side 1628 thereof, rather than along both the front side 1628 and a rear side 1648 thereof opposite the front side 1628.

Figure 17:
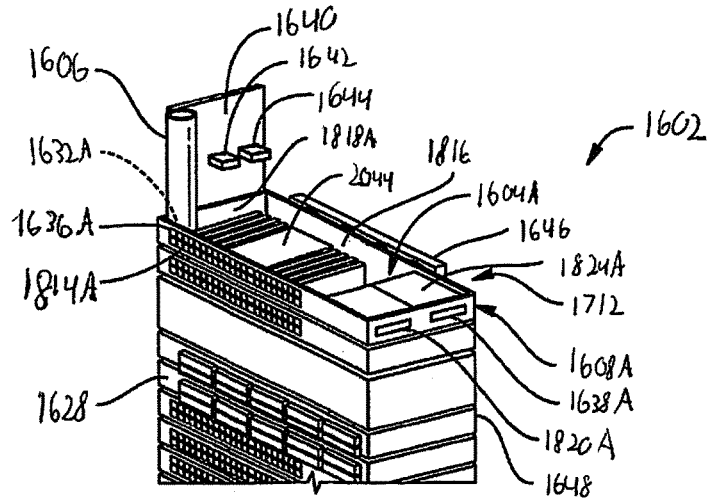
FIG. 17 is a perspective view of the rack of FIG. 16 with the support chassis in a closed position.
Figure 19:
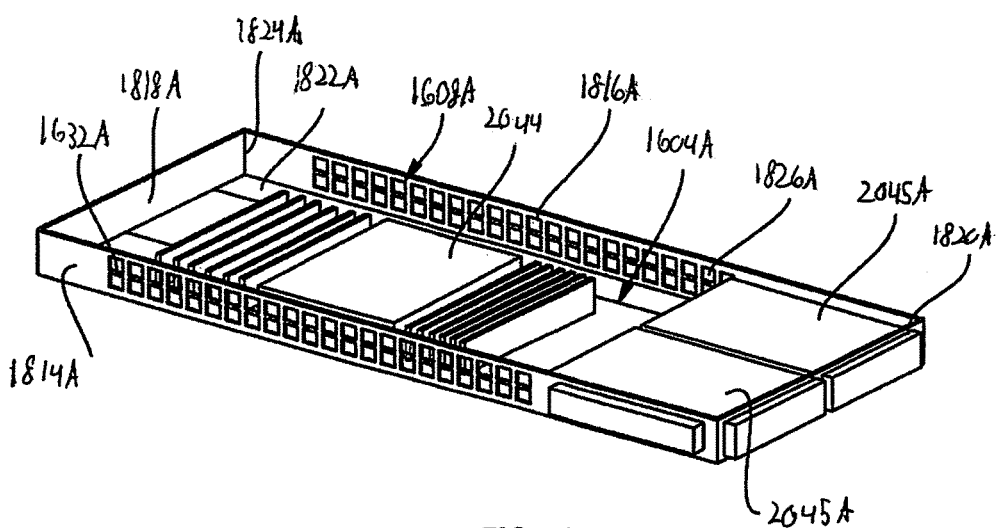
FIG. 19 is a perspective view of the support chassis shown in FIG. 18 with the sled mounted in the support chassis.

The support chassis 1608A illustratively includes a front panel 1814A, a rear panel 1816A arranged opposite the front panel 1814A, and a pair of side panels 1818A, 1820A that extend between the front and rear panels 1814A, 1816A and are arranged opposite one another, as shown in FIGS. 18 and 19. In cooperation with a bottom panel 1822A, the front and rear panels 1814A, 1816A and the side panels 1818A, 1820A define an interior space 1824A. The interior space 1824A is accessible through a top plane or opening 1826A arranged opposite the bottom panel 1822A when the support chassis 1608A is in the opened position 1610. The sled 1604A is housed in the interior space 1824A when the support chassis 1608A is in the closed position 1710, as shown in FIG. 17. Additionally, the sled 1604A is housed in the interior space 1824A prior to being dismounted from the support chassis 1608A and after being re-mounted in the support chassis 1608A. The sled 1604A may be mounted in the support chassis 1608A by inserting the sled 1604A through the top plane 1826A in a direction 1827 into the interior space 1824A when the support chassis 1608A is in the opened position 1610, as further discussed below. Conversely, the sled 1604A may be dismounted from the support chassis 1608A by removing the sled 1604A from the interior space 1824A in a direction 1829 opposite to the direction 1827 through the top plane 1826A when the support chassis 1608A is in the opened position 1610. Additionally or alternatively, in some embodiments, the sled 1604A may be dismounted from the support chassis 1608A by sliding the sled 1604A through the front side 1628.

The illustrative sled 1604A is configured for installation in, and removal from, the rack 1602 by a user or a robot. When a robot or a user faces the front side 1628 of the rack 1602, and when the support chassis 1608A is in the closed position 1710, access to the sled 1604A via the side panel 1820A and the top plane 1826A is restricted, as shown in FIG. 17. However, when a robot or user faces the front side 1628 and the support chassis 1608A is in the opened position 1610, access to the sled 1604A via the side panel 1820A and the top plane 1826A is facilitated, as shown in FIG. 16. Consequently, the sled 1604A may be dismounted from, and mounted in, the support chassis 1608A as discussed above when the support chassis 1608A is in the opened position 1610.

In the illustrative embodiment, the support chassis 1608A is arranged such that the sled 1604A is disconnected from a data connector 1642 when the support chassis 1608A is in the opened position 1610, as further discussed below. In some embodiments, the data connector 1642 may be coupled to, or otherwise form a part of, an optical fabric, which may comprise optical signaling media and/or optical switching infrastructure such as a dual-mode optical switching infrastructure, for example. In such embodiments, the data connector 1642 may be coupled to, or otherwise form a part of, the optical fabric discussed above in regard to FIG. 2. For example, the data connector 1642 may substantially similar to the optical data connector of the rack 240 discussed above. In any case, the support chassis 1608A is also arranged such that the sled 1604A is connected to the data connector 1642 when the support chassis 1608A is in the closed position 1710, as further discussed below.

The illustrative elongated support post 1606 is received by each one of the support chassis 1608, as shown in FIGS. 16-18. More specifically, the elongated support post 1606 is received by a cutout 1632 of each one of the support chassis 1608. In the illustrative embodiment, the elongated support post 1606 has a cylindrical shape and includes an exterior surface 1634. As further discussed below, the exterior surface 1634 is configured to interface with each one of the support chassis 1608 such that each support chassis 1608 is pivotally movable relative to the post 1606 between the opened position 1610 and the closed position 1710.

In the illustrative embodiment, when the elongated support post 1606 is received by each one of the support chassis 1608, each one of the support chassis 1608 is cantilevered by the elongated support post 1606. Put differently, each one of the support chassis 1608 receives support from the elongated support post 1606 substantially only adjacent an end 1636 thereof, as shown in FIGS. 16-18. For example, the support chassis 1608A, which extends in a horizontal direction indicated by arrow H between opposite ends 1636A, 1638A defined by the respective side panels 1818A, 1820A when the support chassis 1608A is in the closed position 1710, receives support from the elongated support post 1606 substantially only adjacent the end 1636A.

The illustrative rack 1600 includes a spine 1640 that extends in the vertical direction V. When each one of the support chassis 1608 is in the closed position 1710, the spine 1640 is arranged between the cutout 1632 and the rear panel 1816 of each support chassis 1608, as shown in FIG. 17. For example, when the support chassis 1608A is in the closed position 1710, the spine 1640 is arranged between the cutout 1632A and the rear panel 1816A. Additionally, when each one of the support chassis 1608 is in the closed position 1710, the spine 1640 is arranged parallel to the side panels 1818, 1820 of each support chassis 1608. For example, when the support chassis 1608A is in the closed position 1710, the spine 1640 is arranged parallel to the side panels 1818A, 1820A of the support chassis 1608A.

When each one of the support chassis 1608 is in the opened position 1610, the spine 1640 is arranged perpendicular to the side panels 1818, 1820 of each support chassis 1608, as shown in FIG. 16. For example, when the support chassis 1608A is in the opened position 1610, the spine 1640 is arranged perpendicular to the side panels 1818A, 1820A of the support chassis 1608A.

The illustrative spine 1640 may support input/output devices (not shown). The input/output devices may be configured to facilitate input/output operations with physical resources 2044 (see FIG. 20) supported by the multiple support chassis 1608. In some embodiments, in cooperation with the physical resources 2044 included in the sleds 1604, the input/output devices may provide an input/output (I/O) subsystem. In such embodiments, the input/output devices may include, or otherwise be embodied as, memory controller hubs, input/output control hubs, firmware devices, communication links (i.e., point-to-point links, bus links, wires, cables, light guides, printed circuit board traces, etc.) and/or other components and subsystems to facilitate the input/output operations. In addition, the illustrative spine 1640 supports the data connector 1642 and may, in some embodiments, support a power connector 1644, which may provide power to the sled 1604A when in the closed position 1710.

In the illustrative embodiment, the rack 1602 includes a fan array 1646, as shown in FIGS. 16-18. The fan array 1646 is configured for attachment to the rear side 1648 of the rack 1602 arranged opposite the front side 1628. The fan array 1646 includes one or more rows of cooling fans 1650 configured to displace air in the direction indicated by arrow 1652 between the front and rear sides 1628, 1648 of the rack 1602 to cool components housed by the rack 1602, such as the physical resources 2044 included in the sleds 1604, for example.

Additionally, in the illustrative embodiment, the rack 1602 includes, or is otherwise coupled to, an air displacement unit (not shown). The air displacement unit is configured to displace air in the vertical direction V to cool components housed by the rack 1602, such as the physical resources 2044 included in the sleds 1604, for example. The air displacement unit may be embodied as, or otherwise include, a fan array similar to the fan array 1646. In combination with the fan array 1646, the air displacement unit may be provided to maximize airflow through the illustrative rack 1602.

Figure 20:
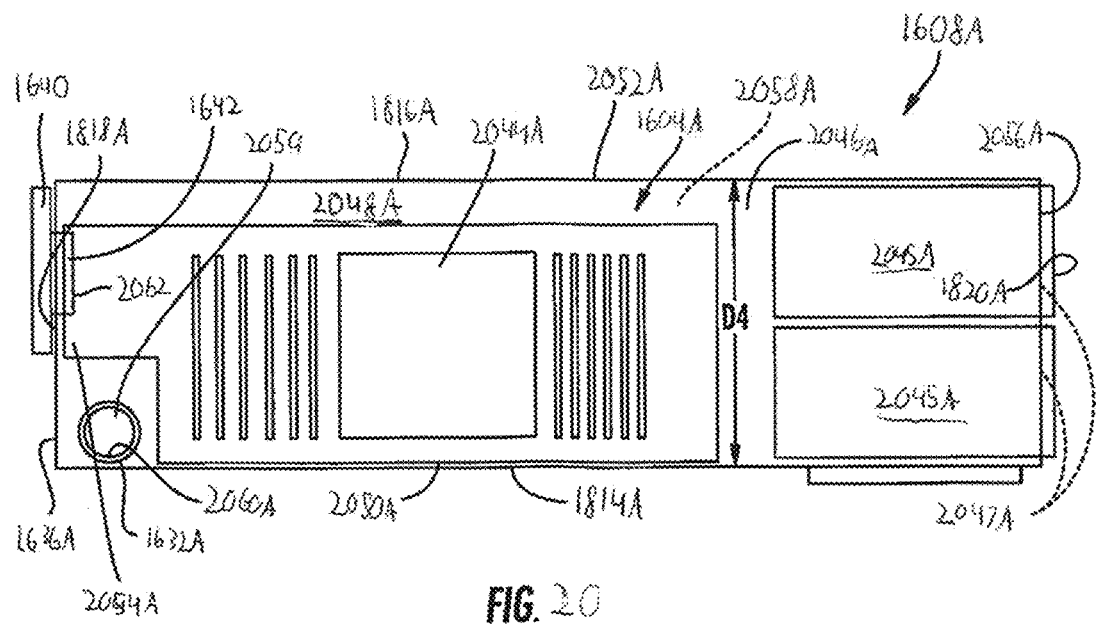
FIG. 20 is a top view of the support chassis shown in FIG. 18 with the sled mounted in the support chassis.

Referring now to FIG. 20, the sled 1604A illustratively includes a chassis-less circuit board substrate 2046A and the physical resources 2044A mounted to a top side 2048A of the chassis-less circuit board substrate 2046A. The physical resources 2044A may be embodied as any type of processor, controller, or other compute circuit capable of performing various tasks such as compute functions and/or controlling the functions of the sled 1604A depending on, for example, the type or intended functionality of the sled 1604A. For example, the physical resources 2044A may be embodied as high-power processors in embodiments in which the sled 1604A is embodied as a compute sled, as accelerator co-processors or circuits in embodiments in which the sled 1604A is embodied as an accelerator sled, and/or as storage controllers in embodiments in which the sled 1604A is embodied as a storage sled. The sled 1604A may include one or more additional components, such as, but not limited to, a communication circuit having a network interface controller, physical resources in addition to those discussed above, an input/output (I/O) subsystem, a power connector, one or more memory devices, and one or more data storage drives 2045A, again depending on the type of the sled 1604A. Additionally, the sled 1604A may include a connector 2062 coupled to the chassis-less circuit board substrate 2046A that is sized to receive the data connector 1642.

The illustrative sled 1604A includes a front face 2050A, a rear face 2052A arranged opposite the front face 2050A, and a pair of side faces 2054A, 2056A that extend between the front and rear faces 2050A, 2052A and are arranged opposite one another. When the sled 1604A is mounted in the support chassis 1608A as shown in FIG. 20, the front face 2050A is arranged parallel to the front panel 1814A, the rear face 2052A is arranged parallel to the rear panel 1816A, the side face 2054A is arranged parallel to the side panel 1818A, and the side face 2056A is arranged parallel to the side panel 1820A. Additionally, when the sled 1604A is mounted in the support chassis 1608A, a bottom side 2058A of the sled 1604A arranged opposite the top side 2048A interfaces with the bottom panel 1822A.

Figure 21:
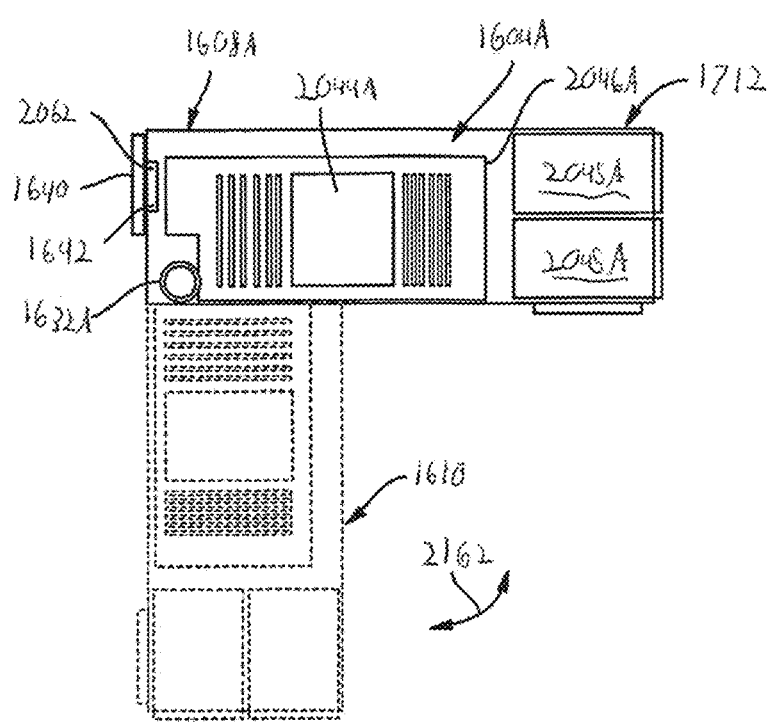
FIG. 21 is a top view of the support chassis similar to FIG. 20 of each of the closed and opened positions of the support chassis.

One or more components of the sled 1604A, such as the data storage drives 2045A, for example, may extend through slots 2047A formed in the side panel 1820A of the support chassis 1608A when the sled 1604A is in each of the opened and closed positions 1610, 1712, as shown in FIGS. 20 and 21. As such, when the support chassis 1608A is in the opened position 1610, the component(s) may be removed or inserted through the slots 2047A.

Air is illustratively pulled by the fans 1650 in the direction 1652 from the front side 1628 of the rack 1602 toward the back side 1648 of the rack 1602. As air from the front side 1628 is pulled toward the rear side 1648 by the fans 1650, the air passes over the physical resources 2044A of the sled 1604A and is heated by heat generated by the physical resources 2044A during operation thereof. In some embodiments, the support chassis 1608A and the sled 1604A may be cooled by cooling fluid supplied along portions thereof, such as the front panel 1814A and the front face 2050A and/or the rear panel 1816A and the rear face 2052A, for example. In any case, when the support chassis 1608A is in the closed position 1712, air pulled toward the rear side 1648 by the fans 1650 passes from the front face 2050A of the sled 1604A toward the rear face 2052A along a direction D4 that extends from the front face 2050A to the rear face 2052A. In the illustrative embodiment, each physical resource 2044A is mounted to the substrate 2046A such that no other heat-producing electrical component of the physical resources 2044A shadows each physical resource 2044A along the direction D4. It should be appreciated that heat-producing electrical components of the physical resources 2044A are capable of producing a substantive, non-nominal amount of heat during operation. Put another way, heat-producing electrical components of the physical resources 2044A may be defined as electrical components that produce a sufficient amount of heat to adversely impact the operation of other electrical components, which may include other heat-producing physical resources 2044A. Additionally, shadowing may be said to refer to a configuration in which one heat-producing physical resource 2044A is in-line with another heat-producing physical resource 2044A along a linear airflow path (e.g., a path along the direction D4) such that air moving along the airflow path may be heated by heat produced by the one heat-producing physical resource 2044A before moving to the another heat-producing physical resources 2044A.

The illustrative support chassis 1608A includes the cutout 1632A that is located adjacent the end 1636A, as shown in FIG. 20. In the illustrative embodiment, the cutout 1632A has a circular shape and is sized to receive the elongated support post 1606. When the cutout 1632A receives the elongated support post 1606, the support chassis 1608A is cantilevered by the elongated support post 1606 adjacent the end 1636A.

In the illustrative embodiment, the cutouts 1632 of the support chassis 1608 are sized to receive one or more cables 2059, as shown in FIG. 20. The cables 2059 may be embodied as, or otherwise include, one or more power and/or data communication cables coupled to one or more devices supported by the multiple support chassis 1608. For example, the cables 2059 may supply power to the power connector 1644 and/or data to the data connector 1642, for example. The cables 2059 may be routed through cutouts 1632 of support chassis 1608 that are spaced from another in the vertical direction V. In some embodiments, when the cutouts 1632 of the support chassis 1608 receive the elongated support post 1606, the cables 2059 may be routed through the elongated support post 1606.

In the illustrative embodiment, an interior surface 2060A of the support chassis 1608A defines the cutout 1632A. The interior surface 2060A is configured to interface with the exterior surface 1634 of the elongated support post 1606 such that the support chassis 1608A is pivotally movable relative to the elongated support post 1606 between the opened position 1610 and the closed position 1712. As such, the interior surface 2060A at least partially defines, or otherwise provides, a circular bearing surface that interfaces with the exterior surface 1634 to enable the support chassis 1608A to pivot relative to the elongated support post 1606 between the opened and closed positions 1610, 1712.

In some embodiments, other suitable mechanisms may be employed to provide a pivotal coupling between the support chassis 1608A and the elongated support post 1606. For example, a linkage including one or more arms that are pivotally movable relative to the elongated support post 1606 may be coupled between the elongated support post 1606 and the support chassis 1608A. In such embodiments, one or more components of the linkage may be actuated by a suitable actuator to cause the support chassis 1608A to pivot relative to the elongated support post 1606. In some embodiments still, the elongated support post 1606 may be pivotally coupled or hinged to the support chassis 1608A using non-permanent securing mechanisms, such as bolts, straps, belts, or the like.

Referring now to FIG. 21, the support chassis 1608A is shown in solid in the illustrative closed position 1712, and in phantom in the illustrative opened position 1610. In the closed position 1712, the support chassis 1608A is connected to the data connector 1642. In the opened position 1610, the support chassis 1608A is disconnected from the data connector 1642. When the support chassis 1608A is in the opened position 1610, the support chassis 1608A is illustratively angularly spaced (i.e., about the vertical axis 1606A) 90 degrees from when the support chassis 1608A is in the closed position 1712. Accordingly, the support chassis 1608A is pivotally movable 90 degrees relative to the elongated support post 1606 between the closed position 1712 and the opened position 1610, as indicated by arrow 2162.

Figure 22:
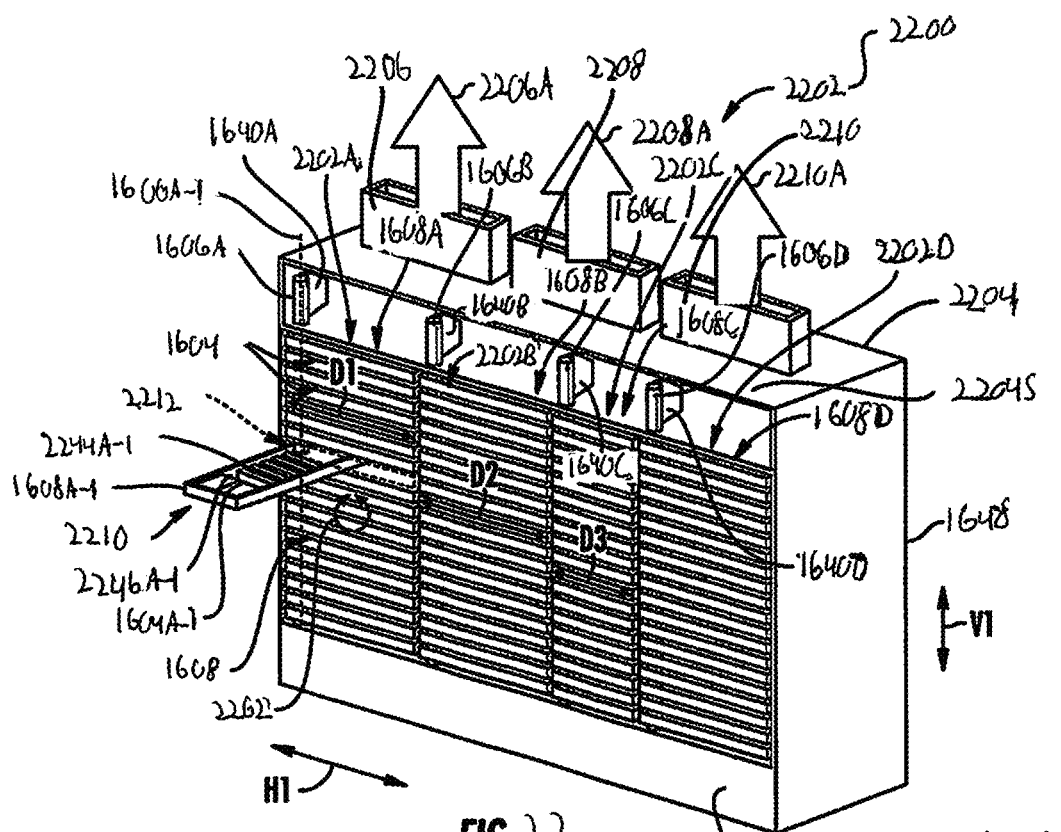
FIG. 22 is a perspective view of at least one embodiment of a rack system of the data center of FIG. 1 with a support chassis of the rack system in an opened position.

Referring now to FIG. 22, multiple racks 2202A, 2202B, 2202C, 2202D may be coupled, mounted, or otherwise situated together to form a rack pad 2202, which may be included a data center 2200. The data center 2200 may be substantially similar to the data center 1600. The racks 2202A, 2202B, 2202C, 2202D are each configured to house or otherwise receive one or more sleds 1604 for mounting therein. Each of the racks 2202A, 2202B, 2202C, 2202D is substantially similar to the rack 1602. The racks 2202A, 2202B, 2202C, 2202D are arranged side by side in a horizontal direction H1 and contained in a housing 2204.

An illustrative duct 2206 is coupled to at least one of the racks 2202A, 2202B and extends through a top surface 2204S of the housing 2204 and outwardly away from the surface 2204S. The duct 2206 is configured to discharge air circulated through at least one of the racks 2202A, 2202B to cool components supported by at least one of the racks 2202A, 2202B in the direction indicated by arrow 2206A. In the illustrative embodiment, the duct 2206 has a rectangular shape. In other embodiments, however, the duct 2206 may take the shape of other suitable geometric forms.

An illustrative duct 2208 is coupled to at least one of the racks 2202B, 2202C and extends through the top surface 2204S of the housing 2204 and outwardly away from the surface 2204S. The duct 2208 is configured to discharge air circulated through at least one of the racks 2202B, 2202C to cool components supported by at least one of the racks 2202B, 2202C in the direction indicated by arrow 2208A. In the illustrative embodiment, the duct 2208 has a rectangular shape. In other embodiments, however, the duct 2208 may take the shape of other suitable geometric forms.

An illustrative duct 2210 is coupled to at least one of the racks 2202C, 2202D and extends through the top surface 2204S of the housing 2204 and outwardly away from the surface 2204S. The duct 2210 is configured to discharge air circulated through at least one of the racks 2202C, 2202D to cool components supported by at least one of the racks 2202C, 2202D in the direction indicated by arrow 2210A. In the illustrative embodiment, the duct 2210 has a rectangular shape. In other embodiments, however, the duct 2210 may take the shape of other suitable geometric forms.

The illustrative rack pod 2202 includes multiple elongated support posts 1606A, 1606B, 1606C, 1606D and multiple support chassis 1608 arranged side by side in support chassis columns 1608A, 1608B, 1608C, 1608D, as shown in FIG. 22. The sleds 1604 are arranged side by side in sled columns 1604A, 1604B, 1604C, 1604D, which are included in, or otherwise correspond to, the respective racks 2202A, 2202B, 2202C, 2202D. The elongated support posts 1606A, 1606B, 1606C, 1606D are included in, or otherwise correspond to, the respective racks 2202A, 2202B, 2202C, 2202D. The support chassis columns 1608A, 1608B, 1608C, 1608D are included in, or otherwise correspond to, the respective racks 2202A, 2202B, 2202C, 2202D. Each of the elongated support posts 1606A, 1606B, 1606C, 1606D is substantially similar to the elongated support post 1606. The support chassis columns 1608A, 1608B, 1608C, 1608D each contain support chassis 1608.

The support chassis columns 1608A, 1608B, 1608C, 1608D are illustratively coupled to respective elongated support posts 1606A, 1606B, 1606C, 1606D. Each of the elongated support posts 1606A, 1606B, 1606C, 1606D extends in a vertical direction indicated by arrow V1. Sled columns 1604A, 1604B, 1604C, 1604D are housed by respective support chassis columns 1608A, 1608B, 1608C, 1608D such that each one of the sleds 1604 is housed by one of the support chassis 1608. Each one of the support chassis 1608 is pivotally movable relative to one of the elongated support posts 1606A, 1606B, 1606C, 1606D between an opened position 2210 and a closed position 2212. As shown in FIG. 22, the support chassis 1608A-1 is rotated about a vertical axis 1606A-1 of the elongated support post 1606A to the opened position 2210 to expose the sled 1604A-1 housed by the chassis 1608A-1. It should be appreciated that the opened and closed positions 2210, 2212 are substantially similar to the respective opened and closed positions 1610, 1712.

When the illustrative support chassis 1608A-1 is rotated about the vertical axis 1606A-1 of the elongated post 1606A to the opened position 2210, the sled 1604A-1 housed by the chassis 1608A-1 may be dismounted from the chassis 1608A-1, similar to the manner in which the sled 1604A may be dismounted from the chassis 1608A. The sled 1604A-1 may be dismounted from the chassis 1608A-1 for maintenance and/or routing servicing, as well as for replacement and/or upgrading. After being dismounted from the chassis 1608A-1, the sled 1604A-1 may be re-mounted in the chassis 1608A-1 in preparation for re-installation in the rack 2202A.

The support chassis 1608A-1 is shown in solid in the illustrative opened position 2210, and in phantom in the illustrative closed position 2212. When the support chassis 1608A-1 is in the opened position 2210, the support chassis 1608A-1 is illustratively angularly spaced (i.e., about the vertical axis 1606A-1) 90 degrees from when the support chassis 1608A-1 is in the closed position 2212. Accordingly, the support chassis 1608A-1 is pivotally movable 90 degrees relative to the elongated support post 1606A between the closed position 2212 and the opened position 2210, as indicated by arrow 2262.

The illustrative rack pod 2202 includes spines 1640A, 1640B, 1640C, 1640D that extend in the vertical direction V1, as shown in FIG. 22. Each of the spines 1640A, 1640B, 1640C, 1640D is substantially similar to the spine 1640. The spines 1640A, 1640B, 1640C, 1640D are included in, or otherwise correspond to, the respective racks 2202A, 2202B, 2202C, 2202D.

In some embodiments, the rack pod 2202 may include a fan array (not shown). Like the fan array 1646, the fan array may include one or more rows of cooling fans configured to displace air between the front side 1628 and the rear side 1648 of the rack pod 2202 to cool components housed by each of the racks 2202A, 2202B, 2202C, 2202D, such as the physical resources 2244, for example. Additionally, in some embodiments, the rack pod 2202 may include, or otherwise be coupled to, an air displacement unit (not shown). The air displacement unit may be configured to displace air in the vertical direction V1 toward the ducts 2206, 2208, 2210 to cool components housed by each of the racks 2202A, 2202B, 2202C, 2202D, such as the physical resources 2244, for example. The air displacement unit may be embodied as, or otherwise include, a fan array.

In the illustrative embodiment, devices housed in the rack 2202A are capable of communicating with devices contained in any one of the racks 2202B, 2202C, 2202D, and vice versa. As such, power and/or data communication cables may extend between the racks 2202A, 2202B, 2202C, 2202D to communicatively couple the racks 2202A, 2202B, 2202C, 2202D sections to one another. Additionally, within each support chassis column 1608A, 1608B, 1608C, 1608D, devices housed by one of the support chassis 1608 are capable of communicating with devices housed by another one of the support chassis 1608. Power and/or data communication cables may therefore extend between two or more of the support chassis 1608 located within each support chassis column 1608A, 1608B, 1608C, 1608D.

In the illustrative arrangement of the rack pod 2202, the elongated support posts 1606A, 1606B, 1606C, 1606D are spaced from one another in the horizontal direction H1, as shown in FIG. 22. Specifically, the elongated support post 1606A is spaced a horizontal distance D1 from the elongated support post 1606B, the elongated support post 1606B is spaced a horizontal distance D2 from the elongated support post 1606C, and the elongated support post 1606D is spaced a horizontal distance D3 from the elongated support post 1606C. The distance D1 is illustratively different from at least one of the distance D2 and the distance D3. Accordingly, the dimensions of each of the racks 2202A, 2202B, 2202C, 2202D are not the same such that the rack pod 2202 provides multiple racks 2202A, 2202B, 2202C, 2202D of various pitches. The dimensions of the racks 2202A, 2202B, 2202C, 2202D may be selected depending on the particular application of the rack pod 2202. In that respect, the illustrative rack pod 2202 may provide a degree of modularity not attained by other configurations.

Figure 23:
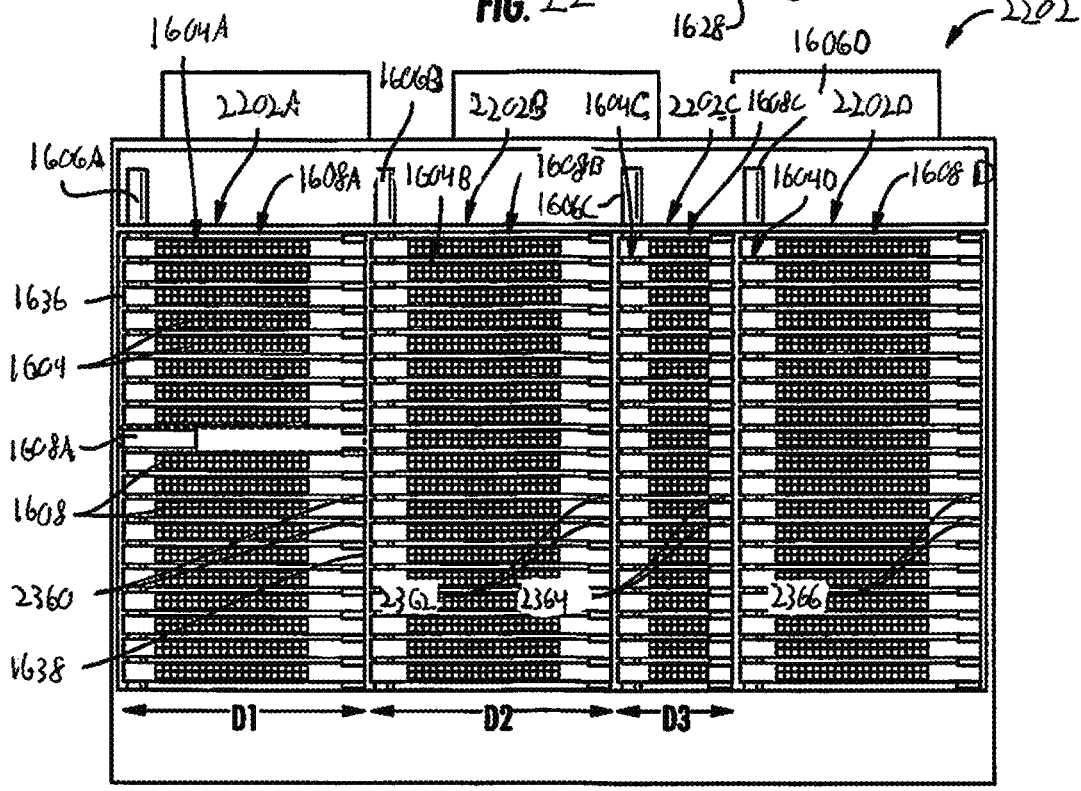
FIG. 23 is a front elevation view of the rack system shown in FIG. 22.

Referring now to FIG. 23, the support chassis 1608 arranged in the support chassis columns 1608A, 1608B, 1608C, 1608D are respectively supported by the elongated support posts 1606A, 1606B, 1606C, 1606D adjacent the ends 1636. When in the closed position 2212, each support chassis 1608 arranged in the support chassis column 1608A is illustratively supported adjacent the end 1638 opposite the end 1636 by a bracket 2360 that is coupled to the elongated support post 1606B and the end 1638. When in the closed position 2212, each support chassis 1608 arranged in the support chassis column 1608B is illustratively supported adjacent the end 1638 by a bracket 2362 that is coupled to the elongated support post 1606C and the end 1638. When in the closed position 2212, each support chassis 1608 arranged in the support chassis column 1608C is illustratively supported adjacent the end 1638 by a bracket 2364 that is coupled to the elongated support post 1606D and the end 1638. When in the closed position 2212, each support chassis 1608 arranged in the support chassis column 1608D is illustratively supported adjacent the end 1638 by a bracket 2366 that may be coupled to the end 1638 and the housing 2204.

In some embodiments, each of the brackets 2360, 2362, 2364, 2366 may be L-shaped. In any case, in combination with the support provided by the elongated support posts 1606A, 1606B, 1606C, 1606D adjacent the ends 1636, the support provided adjacent the ends 1638 by the respective brackets 2360, 2362, 2364, 2366 may dampen vibration of each support chassis 1608 during operation of the rack pod 2202.

Figure 24:
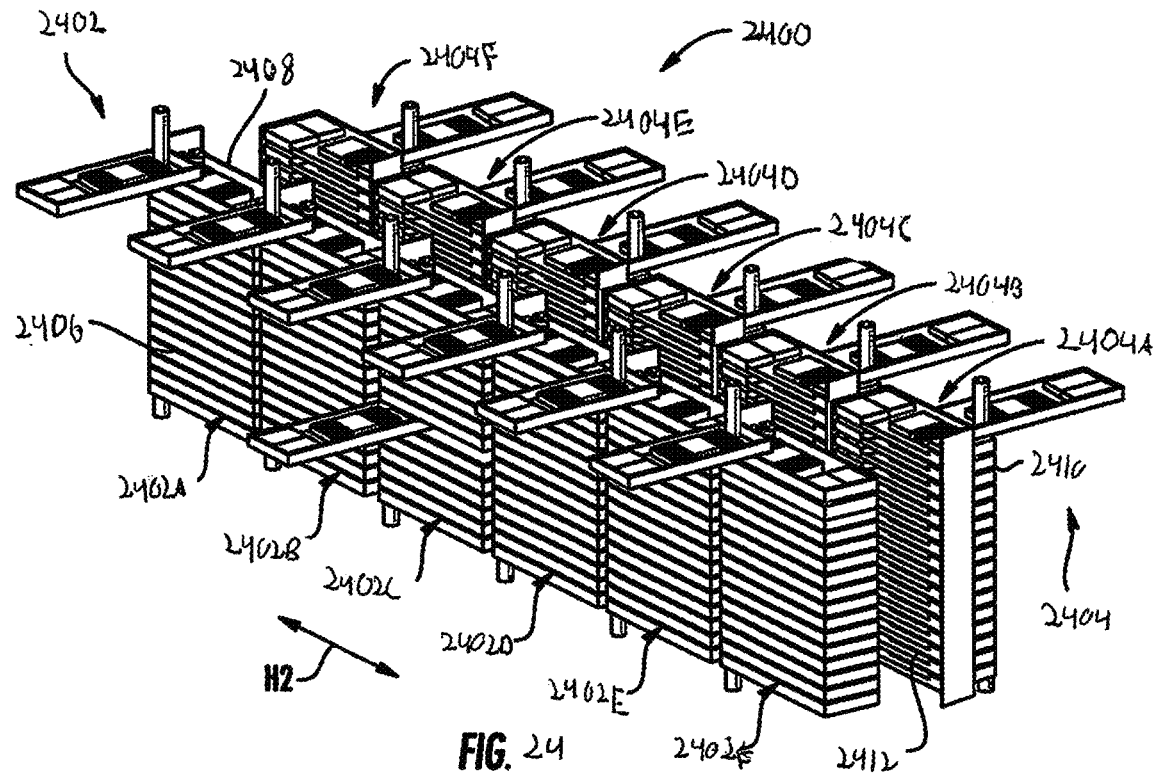
FIG. 24 is a perspective view of another embodiment of a rack system of the data center of FIG. 1 with multiple support chassis of the rack system in opened positions.

Referring now to FIG. 24, multiple racks 2402A, 2402B, 2402C, 2402D, 2402E, 2402F may be coupled, mounted, or otherwise situated together to form an illustrative rack pod 2402, which may be included a data center 2400. Similarly, multiple racks 2404A, 2404B, 2404C, 2404D, 2404E, 2404F may be coupled, mounted, or otherwise situated together to form an illustrative rack pod 2404, which may be included in the data center 2400. The data center 2400 may be substantially similar to the data centers 1600, 2200. The rack pods 2402, 2404 are substantially identical to one another. Each of the racks 2402A, 2402B, 2402C, 2402D, 2402E, 2402F, 2404A, 2404B, 2404C, 2404D, 2404E, 2404F is substantially similar to each of the racks 2202A, 2202B, 2202C, 2202D, and to the rack 1602 discussed above.

The rack pod 2402 includes a front side 2406 and a rear side 2408 arranged opposite the front side 2406. The rack 2404 includes a front side 2410 and a rear side 2412 arranged opposite the front side 2410. In the illustrative arrangement of the rack pods 2402, 2404, the rear sides 2408, 2412 of the respective rack pods 2402, 2404 face one another. Additionally, in the illustrative arrangement of the rack pods 2402, 2404, the front sides 2406, 2410 of the respective rack pods 2402, 2404 face away from one another.

Figure 25:
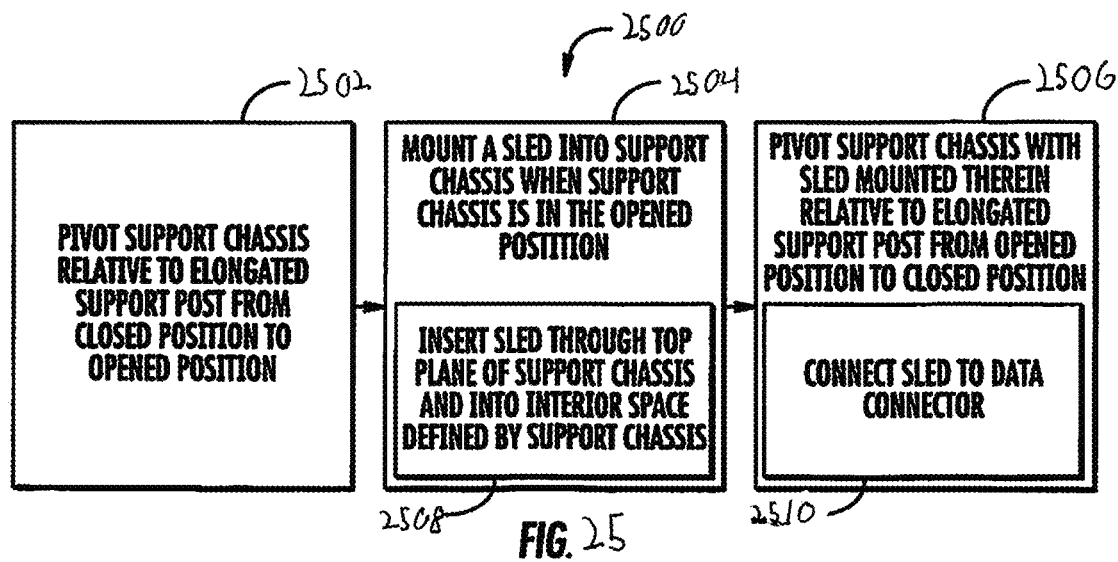
FIG. 25 is a simplified flowchart of a method of installing a sled in the rack of FIG. 16, the rack system of FIG. 22, or the rack system of FIG. 24.

Referring now to FIG. 25, an illustrative method 2500 of installing one of the sleds 1604 in the rack 1602, the racks 2202A, 2202B, 2202C, 2202D, the racks 2402A, 2402B, 2402C, 2402D, 2402E, 2402F, or the racks 2404A, 2404B, 2404C, 2404D, 2404E, 2404F is shown. The method 2500 may be performed by a robot or installer to install one of the sleds 1604 in the rack 1602, the racks 2202A, 2202B, 2202C, 2202D, the racks 2402A, 2402B, 2402C, 2402D, 2402E, 2402F, or the racks 2404A, 2404B, 2404C, 2404D, 2404E, 2404F. The method 2500 begins with block 2502, in which one of the support chassis 1608 is pivoted relative to one of the elongated support posts 1606, 1606A, 1606B, 1606C, 1606D from the closed position 1712, 2212 to the opened position 1610, 2210.

From the block 2502, the method 2500 subsequently proceeds to the block 2504. In the block 2504, one of the sleds 1604 may be mounted into the support chassis 1608 when the support chassis is in the opened position 1610, 2210. To do so, the sled 1604 is inserted through a top plane (e.g., the top plane 1826A) of the support chassis 1608 arranged opposite a bottom panel (e.g., the bottom panel 1822A) of the support chassis 1608 and into an interior space (e.g., the interior space 1824A) defined by the support chassis 1608, as indicated by sub-block 2508.

From the block 2504, the method 2500 subsequently proceeds to the block 2506. In the block 2506, the support chassis 1608 with the sled 1604 mounted therein is pivoted relative to the elongated support post 1606, 1606A, 1606B, 1606C, 1606D from the opened position 1610, 2210 to the closed position 1712, 2212. When the support chassis 1608 with the sled 1604 mounted therein is pivoted to the closed position 1712, 2212, the sled 1604 may be connected to the data connector 1642, as indicated by sub-block 2510.

EXAMPLES

Illustrative examples of the technologies disclosed herein are provided below. An embodiment of the technologies may include any one or more, and any combination of, the examples described below.

Example 1 includes a rack to support a plurality of sleds, the rack comprising an elongated support post that extends vertically; and a plurality of support chassis coupled to the elongated support post, wherein each support chassis of the plurality of support chassis is sized to house a corresponding sled of the plurality of sleds, and wherein each support chassis is pivotally movable relative to the elongated support post between an opened position and a closed position.

Example 2 includes the subject matter of Example 1, and wherein each support chassis of the plurality of support chassis includes an interior space to receive the corresponding sled and a top opening that opens into the interior space, and wherein the top opening is sized to facilitate removal of the corresponding sled from the interior space when each support chassis is in the opened position.

Example 3 includes the subject matter of any of Examples 1 and 2, and wherein the top opening is sized to facilitate insertion of the corresponding sled into the interior space when each support chassis is in the opened position.

Example 4 includes the subject matter of any of Examples 1-3, and further includes a plurality of data connectors, wherein each data connector is positioned to mate with a connector of the corresponding sled when each support chassis is in the closed position.

Example 5 includes the subject matter of any of Examples 1-4, and wherein each data connector is spaced apart from the connector of the corresponding sled when each support chassis is in the opened position.

Example 6 includes the subject matter of any of Examples 1-5, and wherein each support chassis of the plurality of support chassis comprises a side panel having a slot, and wherein when each support chassis is in the opened position, the slot is accessible from a front side of the rack.

Example 7 includes the subject matter of any of Examples 1-6, and wherein when each support chassis is in the closed position, the slot is inaccessible from the front side of the rack.

Example 8 includes the subject matter of any of Examples 1-7, and wherein each sled of the plurality of sleds includes a plurality of data storage drives.

Example 9 includes the subject matter of any of Examples 1-8, and wherein when each support chassis is in the opened position, at least one of the plurality of data storage drives is removable through the slot.

Example 10 includes the subject matter of any of Examples 1-9, and wherein each support chassis of the plurality of support chassis is pivotally movable 90 degrees relative to the elongated support post between the opened position and the closed position.

Example 11 includes the subject matter of any of Examples 1-10, and wherein each support chassis of the plurality of support chassis comprises a circular bearing surface that interfaces with the elongated support post to facilitate pivotal movement of the corresponding support chassis between the opened position and the closed position.

Example 12 includes the subject matter of any of Examples 1-11, and wherein the elongated support post has a cylindrical shape.

Example 13 includes the subject matter of any of Examples 1-12, and wherein each support chassis of the plurality of support chassis includes a cutout sized to receive the elongated support post.

Example 14 includes the subject matter of any of Examples 1-13, and wherein the elongated support post is received by the cutouts of the plurality of chassis such that each support chassis is cantilevered by the elongated support post.

Example 15 includes the subject matter of any of Examples 1-14, and further including a spine that extends vertically and is arranged between the cutouts of the plurality of chassis and rear panels of the plurality of support chassis when each support chassis is in the closed position, wherein the spine supports connectors that supply power and/or network connections to physical resources supported by the plurality of support chassis.

Example 16 includes the subject matter of any of Examples 1-15, and wherein the spine is arranged parallel to side panels of each support chassis of the plurality of support chassis when each support chassis is in the closed position.

Example 17 includes the subject matter of any of Examples 1-16, and wherein the spine is arranged perpendicular to the side panels of each support chassis of the plurality of support chassis when each support chassis is in the opened position.

Example 18 includes the subject matter of any of Examples 1-17, further comprising a fan array to pull air from a front side of the rack toward a rear side of the rack arranged opposite the front side during operation thereof.

Example 19 includes the subject matter of any of Examples 1-18, wherein when each support chassis of the plurality of support chassis is in the closed position, air is pulled by the fan array from a front face of the corresponding sled toward a rear face of the corresponding sled that is arranged opposite the front face along a direction that extends from the front face to the rear face.

Example 20 includes the subject matter of any of Examples 1-19, wherein each sled of the plurality of sleds includes a substrate and a plurality of physical resources mounted to the substrate.

Example 21 includes the subject matter of any of Examples 1-20, wherein each physical resource is mounted to the substrate such that no other heat-producing electrical component of the sled shadows each physical resource along the direction when air is pulled by the fan array from the front face toward the rear face.

Example 22 includes a rack pod comprising a plurality of elongated support posts that extend vertically; a plurality of support chassis arranged in support chassis columns, wherein each support chassis column is coupled to a corresponding elongated support post of the plurality of elongated support posts; and a plurality of sleds, wherein each sled is housed by a corresponding support chassis of the plurality of support chassis, wherein each support chassis of each support chassis column is pivotally movable relative to the corresponding elongated support post between an opened position and a closed position.

Example 23 includes the subject matter of Example 22, and wherein the plurality of elongated support posts includes a first elongated support post, a second elongated support post spaced from the first elongated support post by a first horizontal distance, and a third elongated support post spaced from the second elongated support post by a second horizontal distance.

Example 24 includes the subject matter of any of Examples 22 and 23, and wherein the first horizontal distance is different from the second horizontal distance.

Example 25 includes the subject matter of any of Examples 22-24, and wherein the plurality of elongated support posts includes a fourth elongated post spaced from the third elongated post by a third horizontal distance, and wherein the third horizontal distance is equal to one of the first horizontal distance and the second horizontal distance.

Example 26 includes the subject matter of any of Examples 22-25, and wherein each support chassis of each support chassis column includes an interior space sized to receive one of the plurality of sleds and a top opening that opens into the interior space, and wherein the top opening is sized to facilitate removal of the one sled from the interior space when each support chassis of each support chassis column is in the opened position.

Example 27 includes the subject matter of any of Examples 22-26, and wherein the top opening is sized to facilitate insertion of the one sled into the interior space when each support chassis of each support chassis column is in the opened position.

Example 28 includes the subject matter of any of Examples 22-27, and further including a data connector, wherein the data connector is positioned to mate with a connector of one of the plurality of sleds when each support chassis of each support chassis column is in the closed position.

Example 29 includes the subject matter of any of Examples 22-28, and wherein the data connector is spaced apart from the connector of the one sled when each support chassis of each support chassis column is in the opened position.

Example 30 includes the subject matter of any of Examples 22-29, and wherein each support chassis of each support chassis column comprises a side panel having a slot, and wherein when each support chassis of each support chassis column is in the opened position, the slot is accessible from a front side of the rack pod.

Example 31 includes the subject matter of any of Examples 22-30, and wherein when each support chassis of each support chassis column is in the closed position, the slot is inaccessible from the front side of the rack pod.

Example 32 includes the subject matter of any of Examples 22-31, and wherein each support chassis of each support chassis column is pivotally movable 90 degrees relative to the corresponding elongated support post between the opened position and the closed position.

Example 33 includes the subject matter of any of Examples 22-32, and wherein each support chassis of each support chassis column comprises a circular bearing surface that interfaces with the corresponding elongated support post to facilitate pivotal movement of the each support chassis of each support chassis column between the opened position and the closed position.

Example 34 includes the subject matter of any of Examples 22-33, and wherein each elongated support post of the plurality of elongated support posts has a cylindrical shape.

Example 35 includes the subject matter of any of Examples 22-34, and wherein each support chassis of each support chassis column includes a cutout sized to receive the corresponding elongated support post.

Example 36 includes the subject matter of any of Examples 22-35, and further including a plurality of spines that extend vertically and are arranged between the cutouts of the support chassis of the support chassis columns and rear panels of the support chassis of the support chassis columns when each support chassis of the plurality of support chassis is in the closed position, wherein the spines support connectors that supply power and/or data to physical resources supported by each support chassis of each support chassis column.

Example 37 includes the subject matter of any of Examples 22-36, and wherein each spine is arranged parallel to side panels of each support chassis of a corresponding support chassis column when each support chassis is in the closed position.

Example 38 includes the subject matter of any of Examples 22-37, and wherein each spine is arranged perpendicular to the side panels of each support chassis of a corresponding support chassis column when each support chassis is in the opened position.

Example 39 includes the subject matter of any of Examples 22-38, and wherein (i) each support chassis of at least one support chassis column extends between two elongated support posts of the plurality of elongated posts, (ii) each support chassis of the at least one support chassis column is supported adjacent one end thereof by one of the elongated support posts, and (iii) each support chassis of the at least one support chassis column is supported adjacent another end thereof opposite the one end by a bracket coupled to the other of the elongated support posts when each support chassis is in the closed position.

Example 40 includes a method of installing a sled in a rack of a data center, the method comprising pivoting a support chassis of the rack relative to an elongated support post of the rack coupled thereto from a closed position to an opened position; mounting a sled into the support chassis when the support chassis is in the opened position; and pivoting the support chassis with the sled mounted therein relative to the elongated support post from the opened position to the closed position.

Example 41 includes the subject matter of Example 40, and wherein mounting the sled into the support chassis when the support chassis is in the opened position comprises inserting the sled through a top plane arranged opposite a bottom panel of the support chassis and into an interior space defined by the support chassis.

Example 42 includes the subject matter of any of Examples 40 and 41, and wherein pivoting the support chassis with the sled mounted therein relative to the elongated support post from the opened position to the closed position comprises connecting the sled to a data connector.

The invention claimed is:

1. A rack to support a plurality of sleds, the rack comprising:
an elongated support post that extends vertically; and
a plurality of support chassis coupled to the elongated support post, wherein each support chassis of the plurality of support chassis is sized to house a corresponding sled of the plurality of sleds, and wherein each support chassis is pivotally movable relative to the elongated support post between an opened position and a closed position, each support chassis of the plurality of support chassis comprises a side panel having a slot, and wherein when each support chassis is in the opened position, the slot is accessible from a front side of the rack, and wherein when each support chassis is in the closed position, the slot is inaccessible from the front side of the rack.

2. The rack of claim 1, wherein each support chassis of the plurality of support chassis includes an interior space to receive the corresponding sled and a top opening that opens into the interior space, and wherein the top opening is sized to facilitate removal of the corresponding sled from the interior space when each support chassis is in the opened position, and wherein the top opening is sized to facilitate insertion of the corresponding sled into the interior space when each support chassis is in the opened position.

3. The rack of claim 1, further comprising a plurality of data connectors, wherein each data connector is positioned to mate with a connector of the corresponding sled when each support chassis is in the closed position, and wherein each data connector is spaced apart from the connector of the corresponding sled when each support chassis is in the opened position.

4. The rack of claim 1, wherein each sled of the plurality of sleds includes a plurality of data storage drives, and wherein when each support chassis is in the opened position, at least one of the plurality of data storage drives is removable through the slot.

5. The rack of claim 1, wherein each support chassis of the plurality of support chassis is pivotally movable 90 degrees relative to the elongated support post between the opened position and the closed position.

6. The rack of claim 5, wherein each support chassis of the plurality of support chassis comprises a circular bearing surface that interfaces with the elongated support post to facilitate pivotal movement of the corresponding support chassis between the opened position and the closed position, and wherein the elongated support post has a cylindrical shape.

7. The rack of claim 1, wherein each support chassis of the plurality of support chassis includes a cutout sized to receive the elongated support post.

8. The rack of claim 7, wherein the elongated support post is received by the cutouts of the plurality support of chassis such that each support chassis is cantilevered by the elongated support post.

9. The rack of claim 8, further comprising a spine that extends vertically and is arranged between the cutouts of support the plurality of chassis and rear panels of the plurality of support chassis when each support chassis is in the closed position, wherein the spine supports connectors that supply power and/or network connections to physical resources supported by the plurality of support chassis.

10. The rack of claim 9, wherein the spine is arranged parallel to side panels of each support chassis of the plurality of support chassis when each support chassis is in the closed position, and wherein the spine is arranged perpendicular to the side panels of each support chassis of the plurality of support chassis when each support chassis is in the opened position.

11. The rack of claim 1, further comprising a fan array to pull air from a front side of the rack toward a rear side of the rack arranged opposite the front side during operation thereof, wherein when each support chassis of the plurality of support chassis is in the closed position, air is pulled by the fan array from a front face of the corresponding sled toward a rear face of the corresponding sled that is arranged opposite the front face along a direction that extends from the front face to the rear face.

12. The rack of claim 11, wherein each sled of the plurality of sleds includes a substrate and a plurality of physical resources mounted to the substrate, and wherein each physical resource is mounted to the substrate such that no two physical resources shadow each other along the direction when air is pulled by the fan array from the front face toward the rear face.

13. A rack pod comprising:
a plurality of elongated support posts that extend vertically;
a plurality of support chassis arranged in support chassis columns, wherein each support chassis column is coupled to a corresponding elongated support post of the plurality of elongated support posts; and
a plurality of sleds, wherein each sled is housed by a corresponding support chassis of the plurality of support chassis, wherein each support chassis of each support chassis column is pivotally movable relative to the corresponding elongated support post between an opened position and a closed position, each support chassis of each support chassis column comprises a side panel having a slot, and wherein when each support chassis of each support chassis column is in the opened position, the slot is accessible from a front side of the rack pod, and wherein when each support chassis of each support chassis column is in the closed position, the slot is inaccessible from the front side of the rack pod.

14. The rack pod of claim 13, wherein the plurality of elongated support posts includes a first elongated support post, a second elongated support post spaced from the first elongated support post by a first horizontal distance, and a third elongated support post spaced from the second elongated support post by a second horizontal distance, and wherein the first horizontal distance is different from the second horizontal distance.

15. The rack pod of claim 14, wherein the plurality of elongated support posts includes a fourth elongated post spaced from the third elongated post by a third horizontal distance, and wherein the third horizontal distance is equal to one of the first horizontal distance and the second horizontal distance.

16. The rack pod of claim 13, wherein each support chassis of each support chassis column includes an interior space sized to receive one of the plurality of sleds and a top opening that opens into the interior space, and wherein the top opening is sized to facilitate removal of the one sled from the interior space when each support chassis of each support chassis column is in the opened position, and wherein the top opening is sized to facilitate insertion of the one sled into the interior space when each support chassis of each support chassis column is in the opened position.

17. The rack pod of claim 13, further comprising a data connector, wherein the data connector is positioned to mate with a connector of one of the plurality of sleds when each support chassis of each support chassis column is in the closed position, and wherein the data connector is spaced apart from the connector of the one sled when each support chassis of each support chassis column is in the opened position.

18. The rack pod of claim 13, wherein each support chassis of each support chassis column is pivotally movable 90 degrees relative to the corresponding elongated support post between the opened position and the closed position.

19. The rack pod of claim 18, wherein each support chassis of each support chassis column comprises a circular bearing surface that interfaces with the corresponding elongated support post to facilitate pivotal movement of the each support chassis of each support chassis column between the opened position and the closed position, and wherein each elongated support post of the plurality of elongated support posts has a cylindrical shape.

20. The rack pod of claim 13, wherein each support chassis of each support chassis column includes a cutout sized to receive the corresponding elongated support post.

21. The rack pod of claim 20, further comprising a plurality of spines that extend vertically and are arranged between the cutouts of the support chassis of the support chassis columns and rear panels of the support chassis of the support chassis columns when each support chassis of the plurality of support chassis is in the closed position, wherein the spines support connectors that supply power and/or data to physical resources supported by each support chassis of each support chassis column.

22. The rack pod of claim 21, wherein each spine of the plurality of spines is arranged parallel to side panels of each support chassis of the plurality of support chassis of a corresponding support chassis column when each support chassis is in the closed position, and wherein each spine of the plurality of spines is arranged perpendicular to the side panels of each support chassis of a corresponding support chassis column when each support chassis is in the opened position.

23. The rack pod of claim 20, wherein (i) each support chassis of at least one support chassis column extends between two elongated support posts of the plurality of elongated support posts, (ii) each support chassis of the at least one support chassis column is supported adjacent one end thereof by one of the elongated support posts, and (iii) each support chassis of the at least one support chassis column is supported adjacent another end thereof opposite the one end by a bracket coupled to the other of the elongated support posts when each support chassis is in the closed position.

24. A method of installing a sled in a rack of a data center, the method comprising:
pivoting a support chassis of a plurality of support chassis of the rack relative to an elongated support post of the rack coupled thereto from a closed position to an opened position;
mounting the sled into the support chassis when the support chassis is in the opened position; and
pivoting the support chassis with the sled mounted therein relative to the elongated support post from the opened position to the closed position, each support chassis of the plurality of support chassis comprises a side panel having a slot, and wherein when each support chassis of the plurality of support chassis is in the opened position, the slot is accessible from a front side of the rack, and wherein when each support chassis of the plurality of support chassis is in the closed position, the slot is inaccessible from the front side of the rack.

25. The method of claim 24, wherein mounting the sled into the support chassis when the support chassis is in the opened position comprises inserting the sled through a top plane arranged opposite a bottom panel of the support chassis and into an interior space defined by the support chassis.

26. The method of claim 24, wherein pivoting the support chassis with the sled mounted therein relative to the elongated support post from the opened position to the closed position comprises connecting the sled to a data connector.

* * * * *